(12) United States Patent
Li et al.

(10) Patent No.: US 12,224,934 B2
(45) Date of Patent: Feb. 11, 2025

(54) COMMUNICATION METHOD AND RELATED DEVICE

(71) Applicant: HUAWEI TECHNOLOGIES CO., LTD., Guangdong (CN)

(72) Inventors: Guangpeng Li, Beijing (CN); Sheng Jiang, Beijing (CN); Zhe Chen, Beijing (CN); Taixin Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 802 days.

(21) Appl. No.: 17/411,745

(22) Filed: Aug. 25, 2021

(65) Prior Publication Data

US 2021/0385162 A1 Dec. 9, 2021

Related U.S. Application Data

(63) Continuation of application No. PCT/CN2020/080314, filed on Mar. 20, 2020.

(30) Foreign Application Priority Data

Mar. 25, 2019 (CN) .......................... 201910229021.3

(51) Int. Cl.
*H04L 45/74* (2022.01)
*H04L 12/28* (2006.01)
*H04L 69/22* (2022.01)

(52) U.S. Cl.
CPC .............. *H04L 45/74* (2013.01); *H04L 12/28* (2013.01); *H04L 69/22* (2013.01)

(58) Field of Classification Search
None
See application file for complete search history.

(56) References Cited

U.S. PATENT DOCUMENTS

| 6,125,441 | A | 9/2000 | Green | |
|---|---|---|---|---|
| 8,077,720 | B2 * | 12/2011 | Vuppula | ............. H04L 61/2596 370/428 |
| 2005/0180417 | A1 * | 8/2005 | Hasegawa | ............... H04L 45/00 370/389 |

(Continued)

FOREIGN PATENT DOCUMENTS

| CA | 2525199 A1 | 5/2007 |
|---|---|---|
| CN | 102404716 A | 4/2012 |

(Continued)

OTHER PUBLICATIONS

Extended European Search Report issued in European Application No. 20777575.0 on Jan. 27, 2022, 8 pages.

(Continued)

*Primary Examiner* — Robert M Morlan
(74) *Attorney, Agent, or Firm* — Fish & Richardson P.C.

(57) ABSTRACT

This application discloses a communication method and a related device. The communication method includes: A first in-domain device determines an address length, where the "in-domain" refers to being in a local area network. Then, the first in-domain device receives a data packet, and extracts an address from the data packet based on the address length. Further, the first in-domain device forwards the data packet based on the address.

26 Claims, 6 Drawing Sheets

| FHE | First bit | Second bit | Third bit | Fourth bit | Fifth bit | Sixth bit | Seventh bit | Eighth bit |
|---|---|---|---|---|---|---|---|---|
| Header fields | Version field (four bits) | Traffic class field (eight bits) | Flow label field (20 bits) | Payload length field (16 bits) | Next header field (eight bits) | Hop limit field (eight bits) | Source address field (m bits) | Destination address field (n bits) |

(56) References Cited

U.S. PATENT DOCUMENTS

| | | | |
|---|---|---|---|
| 2010/0124176 A1 | 5/2010 | Fan et al. | |
| 2014/0047322 A1 | 2/2014 | Kim et al. | |
| 2017/0199832 A1* | 7/2017 | Mishra | G06F 13/364 |
| 2017/0237658 A1* | 8/2017 | Roberts | H04L 61/5038 370/392 |
| 2017/0237835 A1 | 8/2017 | Savolainen | |

FOREIGN PATENT DOCUMENTS

| | | |
|---|---|---|
| CN | 102892215 A | 1/2013 |
| CN | 103250381 A | 8/2013 |
| CN | 103534993 A | 1/2014 |
| CN | 103581228 A | 2/2014 |
| CN | 106797406 A | 5/2017 |
| WO | 2013071961 A1 | 5/2013 |

OTHER PUBLICATIONS

Liu, "Research and Implementation of Header Compression Algorithms for6LoWPAN Wireless Sensor Networks," Mar. 2015, 2 pages (with English abstract).

Office Action in Chinese Appln. No. 201910229021.3, dated Nov. 4, 2022, 7 pages (with English translation).

IEEE Std 802.15.4-2006, "IEEE Standard for Information technology, Telecommunications and information exchange between systems, Local and metropolitan area networks, Specific requirements, Part 15.4: Wireless Medium Access Control (MAC) and Physical Layer (PHY) Specifications for Low-Rate Wireless Personal Area Networks (WPANs)," Sep. 2006, 323 pages.

Narten et al., "Neighbor Discovery for IP version 6 (IPv6)," Network Working Group, RFC 4861, Sep. 2007, 97 pages.

Jeong et al., "IPv6 Router Advertisement Options for DNS Configuration," Internet Engineering Task Force (IETF), RFC 6106, Nov. 2010, 19 pages.

Montenegro et al., "Transmission of IPV6 Packets over IEEE 802.15.4 Networks," Network Working Group, RFC 4944, Sep. 2007, 30 pages.

Hui et al., "Compression Format for IPV6 Datagrams over IEEE 802.15.4-Based Networks," Internet Engineering Task Force (IETF), RFC 6282, Sep. 2011, 24 pages.

Bormann, "6LoWPAN-GHC: Generic Header Compression for IPV6 over Low-Power Wireless Personal Area Networks (6LoWPANs)," Internet Engineering Task Force (IETF), RFC 7400, Nov. 2014, 24 pages.

Thubert et al., "IPv6 over Low-Power Wireless Personal Area Network (6LoWPAN) Paging Dispatch," Internet Engineering Task Force (IETF), rfc 8025, Nov. 2016, 8 pages.

PCT International Search Report and Written Opinion issued in International Application No. PCT/CN2020/080314 on May 27, 2020, 15 pages (with English translation).

Office Action issued in Chinese Application No. 201910229021.3 on Jun. 14, 2022, 9 pages.

\* cited by examiner

| FHE | First bit | Second bit | Third bit | Fourth bit | Fifth bit | Sixth bit | Seventh bit | Eighth bit |
|---|---|---|---|---|---|---|---|---|
| Header fields | Version field (four bits) | Traffic class field (eight bits) | Flow label field (20 bits) | Payload length field (16 bits) | Next header field (eight bits) | Hop limit field (eight bits) | Source address field (m bits) | Destination address field (n bits) |

FIG. 3B

| Type | Length | Prefix length |L|A| |
|---|---|---|
| Valid lifetime | | |
| Preferred lifetime | | |
| Reserved | | |
| Prefix | | |

COMMUNICATION METHOD AND RELATED DEVICE

CROSS-REFERENCE TO RELATED APPLICATIONS

This application is a continuation of International Application No. PCT/CN2020/080314, filed on Mar. 20, 2020, which claims priority to Chinese Patent Application No. 201910229021.3, filed on Mar. 25, 2019. The disclosures of the aforementioned applications are hereby incorporated by reference in their entireties.

TECHNICAL FIELD

This application relates to the field of communication technologies and, in particular, to a communication method and a related device.

BACKGROUND

IPv6 over low power wireless personal area network (6LoWPAN) is a low-speed wireless personal area network standard based on the internet protocol version 6 (IPv6). In the 6LoWPAN standard, an address in an IPv6 packet of the standard may be compressed for a low-power-consumption network environment. The low-power-consumption network environment is, for example, an internet of things.

However, the 6LoWPAN standard provides an address compression solution based on a link layer protocol, and in the compression solution of the 6LoWPAN standard, an address needs to be compressed according to a specified rule, causing poor applicability of the address compression solution and causing relatively poor communication performance after address compression.

SUMMARY

This application provides a communication method and a related device, to resolve a problem that a 6LoWPAN standard has poor applicability and communication performance is poor after address compression.

According to a first aspect, this application provides a communication method. The method includes: A first in-domain device determines an address length, where the "in-domain" refers to being in a local area network. The first in-domain device receives a data packet. The first in-domain device extracts an address from the data packet based on the address length. The first in-domain device forwards the data packet based on the address.

In this application, the first in-domain device may first determine a length of an address used in a domain. Further, when receiving a data packet to be forwarded in the domain, the first in-domain device may extract an address of the data packet based on the length, and then the first in-domain device forwards the data packet based on the address. It can be learned that, in this implementation, the address used in the domain may be directly used for in-domain routing and forwarding so that overheads can be reduced, and communication performance can be improved.

In a possible implementation, that a first in-domain device determines an address length includes: The first in-domain device receives a message, where the message includes a field indicating an address length. The first in-domain device determines the address length based on the address length indicated by the field. In this application, the length of the address used in the domain may be determined in a plurality of manners. It can be learned that in this implementation, determining of the address length is not limited by a link layer transmission protocol, an operation manner is flexible, and applicability is wide.

In a possible implementation, the method includes: The first in-domain device receives a preconfiguration message, where the preconfiguration message includes the field indicating the address length. The first in-domain device determines the address length indicated by the field as the address length. It can be learned that in this application, the address length may be manually configured.

In a possible implementation, the method includes: The first in-domain device receives the message from a gateway device, where the message includes the field indicating the address length. The first in-domain device determines the address length indicated by the field as the address length. In this implementation, the address length may be determined by the gateway device. The gateway device may be a gateway device that connects the first in-domain device to an external network, or may be a control plane gateway device that is specially configured to determine the address length.

In a possible implementation, the method includes: The first in-domain device receives the message from a second in-domain device, where the message includes the field indicating the address length, and the first in-domain device and the second in-domain device are connected to each other. The first in-domain device determines the address length indicated by the field as the address length. In this implementation, the address length may be determined by the gateway device. The gateway device may be a gateway device that connects the local area network to an external network, or may be a control plane gateway device that is specially configured to determine the address length. In this embodiment, the first in-domain device is not directly connected to any gateway device.

In a possible implementation, the method includes: The first in-domain device determines an address length preset in the first in-domain device as a first length. The first in-domain device receives a message from a second in-domain device, where the message includes a field indicating a second length, the second length is an address length preset in the second in-domain device, and the first in-domain device and the second in-domain device are connected to each other. The first in-domain device determines, based on the field, whether the first length is greater than or equal to the second length. If the first length is greater than or equal to the second length, the first in-domain device determines the first length as the address length. If the first length is less than the second length, the first in-domain device determines the second length as the address length, and sends the message to a third in-domain device, where the third in-domain device and the first in-domain device are connected to each other. In this implementation, in-domain devices in this application may determine, through negotiation, the length of the address used in the domain. In this embodiment, the in-domain devices select a relatively long address length as the address length for subsequent use.

In a possible implementation, that the first in-domain device extracts an address from the data packet based on the address length includes: The first in-domain device extracts the address from the data packet based on the address length and a start location of a field of the address. It can be learned that in this application, the data packet does not directly carry length information of the address so that a header length of the data packet can be reduced, and overheads can be reduced.

In a possible implementation, the data packet includes a flexible header encoding FHE field, and the FHE field indicates whether header fields of the data packet carry a field indicated by a corresponding bit; the header fields include a version field, a traffic class traffic class field, a flow label flow label field, a payload length payload length field, a next header next header field, a hop limit hop limit field, a source address source address field, and a destination address destination address field that are arranged in sequence, and a length of the source address source address field is the address length, and/or a length of the destination address destination address field is the address length; and the first in-domain device determines the start location based on the FHE field.

A header format of the packet transmitted in the domain in this application includes a dispatch field and a type-specific header field. A value of the dispatch field is used to define an address whose length is the address length and that is included in the data packet, and the value of the dispatch field is different from a value of an existing dispatch field included in a 6LoWPAN standard. A format of the type-specific header field includes the flexible header encoding (FHE) field and the header fields. The version field in the header fields defines a relationship between source and destination addresses and the address length. It can be learned that, in this implementation, a format of the length of the address used in the domain can be defined, the length of the address is used flexibly, and the in-domain devices can extract the address based on the header format of the packet.

In a possible implementation, that the first in-domain device determines the start location based on the FHE field includes: The first in-domain device determines a plurality of fields behind the FHE field based on the FHE field, where the plurality of fields belong to the header fields, and the plurality of fields include the field of the address. The first in-domain device sequentially determines a start location of each field based on the FHE field and a length of each of the plurality of fields. In this implementation, the first in-domain device can determine the start location of each field in the header fields based on the FHE field and the version field.

In a possible implementation, that the first in-domain device forwards the data packet based on the address includes: The first in-domain device searches a routing table for a next-hop device based on the address, where the routing table is constructed based on the address with the address length. The first in-domain device sends the data packet to the next-hop device. In this application, after determining the address length, the first in-domain device may construct the routing table according to a routing protocol and construct the routing table based on routing information including the address length. It can be learned that the address used in the domain in this application can be used for routing and forwarding, thereby reducing overheads and improving communication performance.

According to a second aspect, this application further provides a communication method. The method includes: A gateway device determines an address length. The gateway device receives a first packet from a first in-domain device. The gateway device extracts a first address from the first packet based on the address length. The gateway device converts the first address into a second address, and generates a second packet. The gateway device sends the second packet to a server corresponding to the second packet.

A standard IPv6 address should be used for a source address and a destination address of a packet transmitted in an external network. A length of the standard IPv6 address is 128 bits. However, in this application, an address length of a packet transmitted in a local area network may be n, and N is, for example, less than or equal to 128. Based on this, the gateway device needs to convert the address of the packet. In this implementation, the gateway device can convert an address of a packet in a domain into a standard address.

In a possible implementation, that a gateway device determines an address length includes: The gateway device receives a message, where the message includes a field indicating the address length. The gateway device determines the address length based on the field. In this application, the length of the address used in the domain may be determined in a plurality of manners. It can be learned that in this implementation, determining of the address length is not limited by a link layer transmission protocol, an operation manner is flexible, and applicability is wide.

In a possible implementation, that a gateway device determines an address length includes: The gateway device determines the address length based on a total quantity of in-domain devices, where the total quantity is less than or equal to $2^{the\ address\ length}-1$. In this implementation, sufficient address space can be ensured.

In a possible implementation, that the gateway device converts the first address into a second address includes: The gateway device adds a prefix field in front of the first address, to obtain the second address, where the prefix field indicates a network segment to which the second address belongs, and a length of the prefix field satisfies: a length of the second address minus a quantity of bits with the address length. In this implementation, the gateway device can convert the address used in the domain into the standard IPv6 address by adding a prefix.

In a possible implementation, that the gateway device converts the first address into a second address includes: The gateway device determines, from a first correspondence, the second address corresponding to the first address, where the first correspondence includes at least a correspondence between two types of addresses that identify a same device. In this embodiment, when configuring an address, the gateway device may maintain the correspondence between the two types of addresses of the same device, and further search for a required address based on the correspondence when performing address conversion.

In a possible implementation, that the gateway device extracts a first address from the first packet based on the address length includes: The gateway device extracts the first address from the first packet based on the address length and a start location of a field of the first address. It can be learned that in this application, the data packet does not directly carry length information of the address so that a header length of the packet can be reduced, and overheads can be reduced.

In a possible implementation, the first packet includes a flexible header encoding FHE field, and the FHE field indicates whether header fields of the first packet carry a field indicated by a corresponding bit; the header fields include a version field, a traffic class field, a flow label field, a payload length field, a next header field, a hop limit field, a source address field, and a destination address field that are arranged in sequence, and the source address field indicates the first address, or the destination address field indicates the first address; and the gateway device determines the start location based on the FHE field.

A header format of the packet transmitted in the domain in this application includes a dispatch field and a type-specific header field. A value of the dispatch field is used to define an address whose length is the address length and that is included in the data packet, and the value of the dispatch field is different from a value of an existing dispatch field included in a 6LoWPAN standard. A format of the type-specific header field includes the flexible header encoding (FHE) field and the header fields. The version field in the header fields defines a relationship between source and destination addresses and the address length. It can be learned that, in this implementation, a format of the length of the address used in the domain can be defined, the length of the address is used flexibly, and the in-domain devices can extract the address based on the header format of the packet.

In a possible implementation, that the gateway device determines the start location based on the FHE field includes: The gateway device determines a plurality of fields behind the FHE field based on the FHE field, where the plurality of fields belong to the header fields, and the plurality of fields include the field of the first address. The gateway device sequentially determines a start location of each field based on the FHE field and a length of each of the plurality of fields. In this implementation, the first in-domain device can determine the start location of each field in the header fields based on the FHE field and the version field.

In a possible implementation, after that the gateway device receives a first packet from a first in-domain device, the method further includes: The gateway device extracts the first address and a third address from the first packet based on the address length. The gateway device converts the first address into the second address, converts the third address into the fourth address, and generates a third packet. The gateway device sends the third packet to a server corresponding to the third packet. In this implementation, the gateway device can convert both a source address and a destination address of the packet in the domain into standard addresses.

In a possible implementation, a length of the first address is greater than 0 and less than or equal to a length of the second address. In this implementation, a header compression solution of the packet is not limited by the link layer transmission protocol, has a flexible operation manner, and has wide applicability. In addition, the address used in the domain in this application may be directly used for routing and forwarding so that communication performance can be improved.

According to a third aspect, this application provides a communication method. The method includes: A gateway device determines an address length. The gateway device receives a first packet from a first server. The gateway device extracts a first address from the first packet. The gateway device converts the first address into a second address and generates a second packet, where a length of the second address is the address length. The gateway device sends the second packet to an in-domain device corresponding to the second packet.

A standard IPv6 address should be used for a source address and a destination address of a packet transmitted in an external network. A length of the standard IPv6 address is 128 bits. However, in this application, an address length of a packet transmitted in a local area network may be n, and N is, for example, less than or equal to 128. Based on this, the gateway device needs to convert the address of the packet. In this implementation, the gateway device can convert an address of the packet in the external network into an address, with a length, used in a domain.

In a possible implementation, that a gateway device determines an address length includes: The gateway device receives a message, where the message includes a field indicating the address length. The gateway device determines the address length based on the field.

In a possible implementation, that a gateway device determines an address length includes: The gateway device determines the address length based on a total quantity of in-domain devices, where the total quantity is less than or equal to $2^{the\ address\ length} - 1$.

In a possible implementation, that the gateway device converts the first address into a second address includes: The gateway device truncates the last bits, with the address length, of the first address to obtain the second address. In this implementation, the gateway device can convert, by truncating the last n bits of the standard address, the address with the standard length into the address, with the address length, used in the domain.

In a possible implementation, that the gateway device converts the first address into a second address includes: The gateway device determines, from a first correspondence, the second address corresponding to the first address, where the first correspondence includes at least a correspondence between two types of addresses that identify a same device. In this embodiment, when configuring an address, the gateway device may maintain the correspondence between the two types of addresses of the same device and further search for a required address based on the correspondence when performing address conversion.

In a possible implementation, that the gateway device converts the first address into a second address, and generates a second packet further includes: The gateway device adds a flexible header encoding FHE field and header fields to the first packet to obtain the second packet, where the header fields include a version field, a traffic class field, a flow label field, a payload length field, a next header next, a hop limit field, a source address field, and a destination address field that are arranged in sequence, the FHE field indicates fields that are added to the second packet in the header fields, the fields that are added to the second packet in the header fields include the source address field and the destination address field, and the source address field indicates the second address, or the destination address field indicates the second address.

When the packet is transmitted in the external network, a header format of the packet meets a stipulation of a standard IPv6 protocol, that is, in this embodiment, a dispatch field and a type-specific header field in a header of the first packet are fields in a standard IPv6 format. Before transmitting the first packet into the domain, the gateway device may update a value of the dispatch field and add formats used as the type-specific header field, of the FHE field and the header fields to the first packet. The gateway device may further define a value of the version field, a length of the source address field, and a length of the destination address field in the header fields. In this implementation, a format of the length of the address used in the domain can be defined, the length of the address is used flexibly, and the in-domain devices can extract the address based on the header format of the packet.

In a possible implementation, after that the gateway device receives a first packet from a first in-domain device, the method further includes: The gateway device extracts the first address and a third address from the first packet. The gateway device converts the first address into the second address, converts the third address into the fourth address, and generates a third packet, where a length of the second address is the address length, and a length of the fourth address is the address length. The gateway device sends the third packet to an in-domain device corresponding to the third packet. In this implementation, the gateway device can convert both a source address with a standard length and a destination address with the standard length in a packet in a standard format into addresses, with the length, used in the domain.

According to a fourth aspect, this application further provides an address configuration method. The method includes: A first in-domain device determines an address length. The first in-domain device receives a first address from a gateway device, where a length of the first address is the address length. The first in-domain device generates a second address based on the first address, where a length of the second address is the address length. In this implementation, the first in-domain device can configure an address of the first in-domain device based on an interface address of the gateway device, and a configuration manner is flexible.

In a possible implementation, that the first in-domain device generates a second address based on the first address includes: The first in-domain device generates a number. The first in-domain device adds the number to the first address, to obtain the second address. In this implementation, the first in-domain device can configure an address of the first in-domain device based on an interface address of the gateway device, and a configuration manner is flexible.

In a possible implementation, after that the first in-domain device generates a second address based on the first address, the method further includes: the first in-domain device detects whether the second address is occupied. The first in-domain device generates a third address based on the first address if the second address is occupied, where a length of the third address is the address length. The first in-domain device uses the second address as the address of the first in-domain device if the second address is not occupied. In this embodiment, before using an address, each in-domain device detects whether a received address is occupied. If the corresponding address is occupied, the corresponding in-domain device triggers configuration of a new address. If the corresponding address is not occupied, the corresponding in-domain device uses the received address.

In a possible implementation, before that the first in-domain device generates a third address based on the first address if the second address is occupied, the method further includes: The first in-domain device increases a total quantity of duplicate detection times by 1, and determines whether a current total quantity of duplicate detection times is equal to a preset threshold. The first in-domain device outputs alarm information if the current total quantity of duplicate detection times is equal to the preset threshold. The first in-domain device generates the third address based on the first address if the current total quantity of duplicate detection times is less than the preset threshold. In this implementation, the in-domain device can indicate, by using a duplicate detection alarm mechanism, a case in which current address space is insufficient, and then can trigger resetting of the address length, thereby reducing duration for configuring the address, and improving configuration efficiency.

In a possible implementation, before that the first in-domain device generates a third address based on the first address if the second address is occupied, the method further includes: The first in-domain device subtracts 1 from a total quantity of duplicate detection times, and determines whether a current total quantity of duplicate detection times is equal to 0, where an initial value of the total quantity of duplicate detection times is a preset threshold. The first in-domain device outputs alarm information if the current total quantity of duplicate detection times is equal to 0. The first in-domain device generates the third address based on the first address if the current total quantity of duplicate detection times is not equal to 0. In this implementation, the in-domain device can indicate, by using a duplicate detection alarm mechanism, a case in which current address space is insufficient, and then can trigger resetting of the address length, thereby reducing duration for configuring the address, and improving configuration efficiency.

According to a fifth aspect, this application provides an in-domain device. The in-domain device has a function of implementing behavior of the in-domain device in the foregoing methods. The function may be implemented by hardware, or may be implemented by hardware executing corresponding software. The hardware or the software includes one or more modules corresponding to the function. In a possible design, a structure of the in-domain device includes a processor and a transceiver. The processor is configured to enable the in-domain device to perform a corresponding function in the foregoing methods. The transceiver is configured to receive a packet from and send a packet to another in-domain device and a gateway device. The in-domain device may further include a memory. The memory is configured to be coupled to the processor and stores program instructions and data that are necessary for the in-domain device.

According to a sixth aspect, this application provides a gateway device. The gateway device has a function of implementing behavior of the gateway device in the foregoing methods. The function may be implemented by hardware, or may be implemented by hardware executing corresponding software. The hardware or the software includes one or more modules corresponding to the function. In a possible design, a structure of the gateway device includes a processor and a transceiver. The processor is configured to enable the gateway device to perform a corresponding function in the foregoing methods. The transceiver is configured to receive a packet from and send a packet to an in-domain device and a server. The gateway device may further include a memory. The memory is configured to be coupled to the processor, and stores program instructions and data that are necessary for the gateway device.

According to a seventh aspect, this application provides a computer-readable storage medium. The computer-readable storage medium stores instructions. When the instructions are run on a computer, the computer is enabled to perform the method in the first aspect, the second aspect, the third aspect, the fourth aspect, any possible design of the first aspect, any possible design of the second aspect, any possible design of the third aspect, or any possible design of the fourth aspect.

To resolve a problem existing in a conventional technology, in this application, a related device first determines a length of a compressed address, and may further extract an address from a packet based on the address length after receiving the packet. Then, the related device performs a subsequent operation based on the extracted address. It can be learned that in this solution, the header compression solution of the packet is not limited by the link layer transmission protocol, has a flexible operation manner, and has wide applicability. In addition, the address used in the domain in this application may be directly used for routing and forwarding so that communication performance can be improved.

BRIEF DESCRIPTION OF DRAWINGS

To describe the technical solutions in this application more clearly, the following briefly describes the accompanying drawings used for describing embodiments. Apparently, persons of ordinary skill in the art may derive other drawings from these accompanying drawings without creative efforts.

FIG. 3B is a schematic diagram of a correspondence between an FHE field and header fields according to this application;

DESCRIPTION OF EMBODIMENTS

The following clearly describes the technical solutions in this application with reference to the accompanying drawings in this application.

The terms used in the following embodiments of this application are merely intended to describe specific embodiments, but are not intended to limit this application. The terms "one", "a", "the", "the foregoing", "this", and "the one" of singular forms used in this specification and the appended claims of this application are also intended to include plural forms, unless otherwise specified in the context clearly. It should be further understood that although the terms such as "first" and "second" may be used in the following embodiments to describe a type of objects, the objects should not be limited to these terms. These terms are merely used to distinguish between specific objects of this type. For example, the terms such as "first" and "second" may be used in the following embodiments to describe addresses, but the addresses should not be limited to these terms. These terms are merely used to distinguish between a plurality of different addresses. The terms such as "first" and "second" may be used in the following embodiments to describe another type of objects in a similar way, and details are not described herein again. In addition, in descriptions of the following embodiments, "a plurality of" means two or more than two.

Before the technical solutions of this application are described, a technical scenario of this application is first described with reference to the accompanying drawings.

The internet protocol version 6 (IPv6) protocol is widely used as a new-generation address protocol. For example, the IPv6 protocol may be applied to a low-power-consumption network (for example, an internet of things). The low-power-consumption network allows a relatively small data frame to be transmitted. However, an IPv6 address is 128 bits, and is relatively large. Based on this, a 6LoWPAN address compression mechanism is proposed in the art.

Figure 1:
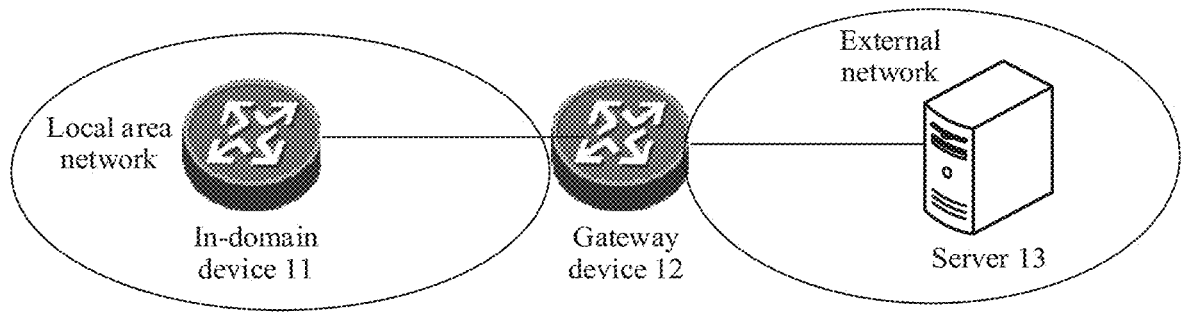
FIG. 1 is a schematic structural diagram of an internet of things 10 according to this application.

For example, FIG. 1 is a schematic structural diagram of an internet of things 10. The internet of things 10 includes an in-domain device 11, a gateway device 12, and a server 13. The "in-domain" in this application refers to a range formed by a local area network (which may also be referred to as an "internal network" or a "cellular network"), the "in-domain" refers to being in the local area network, and the "in-domain device" refers to a device connected in the local area network. Correspondingly, in this application, a network outside the local area network is referred to as an "external network" or "out-domain". The gateway device 12 is configured to connect the local area network and the external network so that the in-domain device 11 sends a packet to the server 13 through the gateway device 12, and the server 13 sends a packet to the in-domain device 11 through the gateway device 12.

It may be understood that, during actual application, the internet of things 10 may include one or more in-domain device entities, one or more gateway device entities, and one or more server entities. The one or more in-domain device entities may be logically equivalent to the in-domain device 11, the one or more gateway device entities may be logically equivalent to the gateway device 12, and the one or more server entities may be logically equivalent to the server 13.

The in-domain device entity is, for example, a physical entity such as a router or a switch. The gateway device entity is, for example, a border router. The server is, for example, a cloud server.

With reference to FIG. 1, after the in-domain device 11, the gateway device 12, and the server 13 establish a connection, an IPv6 address (referred to as an in-domain device address in this application) is set for the device 11, and an IPv6 address (referred to as a server address in this application) is correspondingly set for the server 13. The in-domain device address and the server address can be compressed by using a 6LoWPAN standard. Further, a packet transmitted between the in-domain device 11 and the gateway device 12 may carry fields obtained after the in-domain device address and the server address are compressed, a packet transmitted between in-domain device 11 entities may carry the fields obtained after the in-domain device address and the server address are compressed, and a packet transmitted between the gateway device 12 and the server 13 carries the in-domain device address and the server address.

The 6lowpan standard is an IPv6 header compression method defined based on the 802.15.4 link layer protocol, and is applicable to a short frame transmitted based on the 802.15.4 link layer protocol. When a packet compressed based on the 6lowpan standard is forwarded in a domain, any in-domain device entity needs to recover a compressed header to a standard IPv6 header, the in-domain device entity further determines a next-hop device entity based on the standard IPv6 header, and then the in-domain device entity compresses and forwards the packet to the next-hop device entity.

It can be learned that, the compression solution defined in the 6lowpan standard has the following problems: 1. The 6lowpan standard corresponds to underlying transmission protocol settings. When an underlying transmission technology is updated, the 6lowpan standard needs to reset the compression solution, and scalability is poor. 2. A compression level of the compression solution defined in the 6lowpan standard is fixedly set, and applicability is poor. 3. The in-domain device address and the server address need to be compressed, and the in-domain device address and the server address have a same compression format. 4. When the field obtained after address compression is forwarded in the domain, the field does not have routing and forwarding capabilities.

Based on this, this application provides a communication method and a related device. In the technical solution of this application, the related device first determines a length of a compressed address, and may further extract an address from a packet based on the address length after receiving the packet. Then, the related device performs a subsequent operation based on the extracted address. It can be learned that the solution is not limited by a link layer transmission protocol, has a flexible operation manner, and has wide applicability and communication performance can be improved.

The following describes embodiments of the technical solutions of this application.

Figure 2:
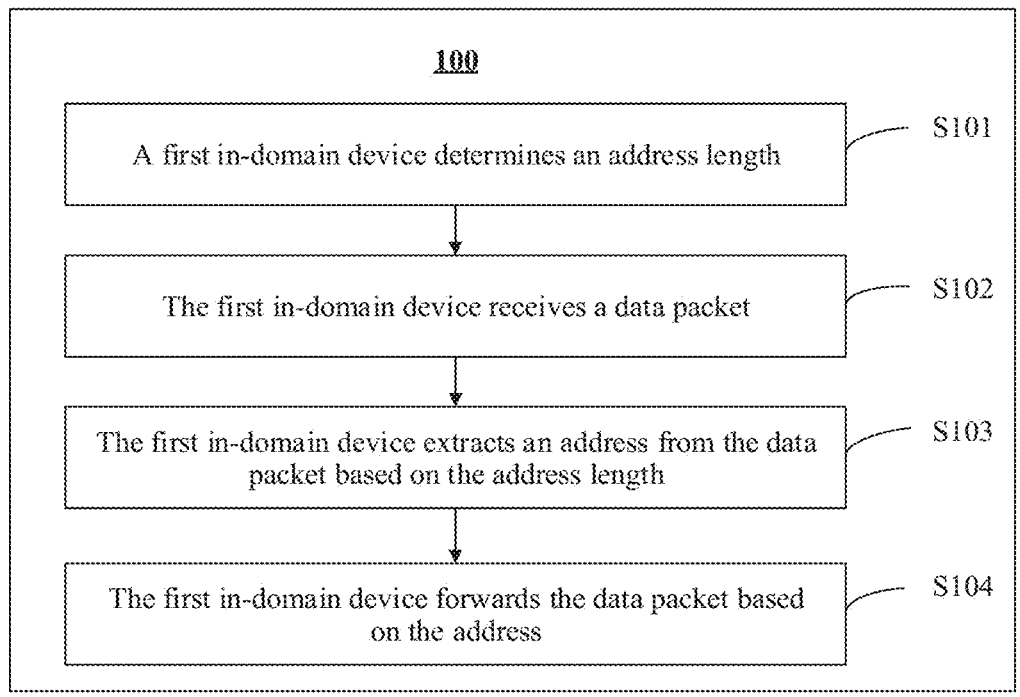
FIG. 2 is an example method flowchart of a communication method 100 according to this application.

FIG. 2 is an example method flowchart of a communication method 100 according to this application. The communication method 100 is implemented in an in-domain forwarding scenario in this application. The communication method 100 includes the following steps.

Step S101: A first in-domain device determines an address length.

As described in the embodiment corresponding to FIG. 1, the "domain" in this application refers to a range formed by a local area network, an internal network, or a cellular network. Correspondingly, the "first in-domain device" may be any device in the local area network.

In this application, the address length may be determined by skilled persons, a gateway device, or an in-domain device. After determining the address length, the foregoing entities may notify, by using a message, the first in-domain device of the address length. Correspondingly, in this embodiment, the first in-domain device may receive the message, where the message includes a field indicating an address length. Further, the first in-domain device may determine the address length based on the address length indicated by the field. It should be noted that the address length indicated by the field in the message is not necessarily equal to the address length.

The following describes a specific operation process of this step with reference to different implementation scenarios.

In a first possible implementation, the skilled persons determine the address length. In this implementation, the skilled persons may determine the address length for the first in-domain device through a device such as an address server. Then, the skilled persons control the corresponding device to generate a preconfiguration message. The skilled persons further control the corresponding device to send the preconfiguration message to the first in-domain device. The preconfiguration message includes the field indicating the address length. Correspondingly, the first in-domain device receives the preconfiguration message, and then determines the address length indicated by the field in the preconfiguration message as the address length.

In a second possible implementation, the gateway device determines the address length. In this implementation, for example, the first device is interconnected to the gateway device. After determining the address length, the gateway device includes, in a message, the field indicating the address length, and then the gateway device notifies the first in-domain device of the message. Correspondingly, the first in-domain device receives the message from the gateway device, and then the first in-domain device determines the address length indicated by the field as the address length. For embodiments in which the gateway device determines the address length, refer to descriptions in the following embodiments in this specification. Details are not described herein.

In a third possible implementation, the gateway device determines the address length. In this implementation, for example, the first device is not directly connected to the gateway device. Identical to the second possible implementation, after determining the address length, the gateway device in this implementation also generates a message, where the message includes the field indicating the address length. Further, the gateway device notifies an in-domain device connected to the gateway device, for example, a second in-domain device of the message. The second in-domain device then sends the message to an in-domain device connected to the second in-domain device. For example, the first in-domain device is connected to the second in-domain device, and the second in-domain device sends the message to the first in-domain device. The first in-domain device then sends the message to an in-domain device connected to the second in-domain device, and so on, until all in-domain devices learn of the address length. For embodiments in which the gateway device determines the address length, refer to descriptions in the following embodiments in this specification. Details are not described herein.

Correspondingly, in this implementation, the first in-domain device may receive the message from the second in-domain device, and then determine the address length indicated by the field in the message as the address length.

It may be understood that, in some embodiments, the gateway device for determining the address length (that is, the gateway device described in the second possible implementation and/or the gateway device described in the third possible implementation) is configured to determine the address length, and is further configured to establish a connection between the local area network in which the first in-domain device is located and an external network. In some other embodiments, the gateway device for determining the address length is, for example, a first gateway device, and the first gateway device is only configured to determine the address length. The first gateway device is, for example, a control plane gateway device. A second gateway device is configured to establish a connection between the local area network in which the first in-domain device is located and an external network.

In a fourth possible implementation, the in-domain device determines the address length. In some embodiments, the address length may be preset in the in-domain device, but address lengths preset in different in-domain devices may be different. Based on this, in this implementation, the first in-domain device determines an address length preset in the first in-domain device as a first length, and then the first in-domain device receives a message from a second in-domain device, where the message includes a field indicating a second length, and the second length is an address length preset in the second in-domain device. Further, the first in-domain device may determine, based on the field in the message, whether the first length is greater than or equal to the second length. If the first length is greater than or equal to the second length, the first in-domain device determines the first length as the address length. If the first length is less than the second length, the first in-domain device determines the second length as the address length. Then, the first in-domain device sends the message to a third in-domain device to trigger the third in-domain device to determine the address length. The first in-domain device is separately connected to the second in-domain device and the third in-domain device.

It may be understood that the foregoing embodiment (that is, the fourth possible implementation) in which the in-domain device determines the address length is merely an example for description. In an actual operation, in-domain devices may send address length field messages of the in-domain devices to each other so that an in-domain device at a receive end determines the address length based on an address length of the in-domain device. Based on this, if the "first in-domain device" and the "second in-domain device" in the fourth possible implementation are interchanged, and the "third in-domain device" is described as being connected to the "second in-domain device", the fourth possible implementation can also be implemented.

Further, after determining the address length, the first in-domain device may construct a routing table according to a routing protocol and construct the routing table based on routing information including the address length. Details are not described herein.

Step S102: The first in-domain device receives a data packet.

The data packet is used for in-domain transmission. In some embodiments, the first in-domain device may receive the data packet from the gateway device, and the gateway device is connected to the first in-domain device. In some other embodiments, the first in-domain device may receive the data packet from another in-domain device.

In this application, a header format of the data packet includes a dispatch field and a type-specific header field. A value of the dispatch field is used to define an address whose length is the address length and that is included in the data packet, and the value of the dispatch field is different from a value of an existing dispatch field included in a 6LoWPAN standard. The value of the dispatch field is, for example, 000011. A format of the type-specific header field is that shown in FIG. 3A, and includes a flexible header encoding (FHE) field and header fields. In the art, the header fields may also be expressed as "flexible fields".

The FHE field is used to indicate whether the data packet carries a field that is in the header fields and that is indicated by a corresponding bit. Specifically, the FHE field includes eight bits. The header fields include eight fields: a version (version) field, a traffic class field, a flow label field, a payload length field, a next header field, a hop limit field, a source address field, and a destination address field. The eight bits in the FHE field respectively indicate whether the eight fields in the header fields are carried.

A source address indicates an address of a device that sends the data packet. In this example, the source address is an address of the first in-domain device. A destination address indicates an address of a device that the data packet finally arrives at. The first in-domain device can learn of, based on the destination address, a next-hop device that receives the data packet. For example, the destination address indicates the second in-domain device, and the first in-domain device may determine, based on the destination address, that the next-hop device is also the second in-domain device. For another example, the destination address indicates a server, but the first in-domain device may determine, based on the destination address, that the next-hop device is the gateway device or.

As shown in FIG. 3B, in a sequence from left to right, the first bit in the eight bits indicates whether the version field is carried, the second bit in the eight bits indicates whether the traffic class field is carried, the third bit in the eight bits indicates whether the flow label field is carried, the fourth bit in the eight bits indicates whether the payload length field is carried, the fifth bit in the eight bits indicates whether the next header field is carried, the sixth bit in the eight bits indicates whether the hop limit field is carried, the seventh bit in the eight bits indicates whether the source address field is carried, and the eighth bit in the eight bits indicates whether the destination address field is carried.

In some embodiments, when any one of the eight bits is "1", it indicates that the data packet carries a field, in the header fields, corresponding to the bit. When any one of the eight bits is "0", it indicates that the data packet does not carry a field, in the header fields, corresponding to the bit. In some other embodiments, when any one of the eight bits is "0", it indicates that the data packet carries a field, in the header fields, corresponding to the bit. When any one of the eight bits is "1", it indicates that the data packet does not carry a field, in the header fields, corresponding to the bit. If all the eight fields in the header fields are carried in the data packet, the eight fields are arranged according to the sequence shown in FIG. 3B.

An example in which when any one of the eight bits is "1", it indicates that the data packet carries a field, in the header fields, corresponding to the bit, and when any one of the eight bits is "0", it indicates that the data packet does not carry a field, in the header fields, corresponding to the bit is used. For example, the FHE field is "10011111", the header fields carried in the data packet are sequentially "the version field, the payload length field, the next header field, the hop limit field, the source address field, and the destination address field".

Figure 3A:
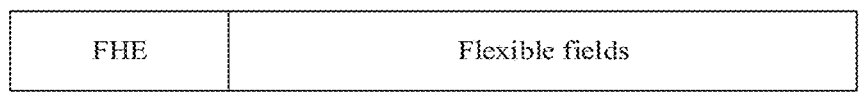
FIG. 3A is a schematic diagram of a format of an FHE field according to this application.

It should be noted that, the field formats shown in FIG. 3A and FIG. 3B are added by the gateway device to an out-domain packet, to obtain the data packet. The "out-domain packet" is a packet received by the gateway device from the external network connected to the local area network. For details about an embodiment in which the gateway device adds the fields shown in FIG. 3A and FIG. 3B, refer to descriptions of the following related embodiments in this specification. Details are not described herein.

It may be understood that, a part of the eight fields are fields required for transmitting the data packet, and the corresponding fields are carried in the data packet. Therefore, bits, in the FHE, corresponding to the fields are set to 1. A part of the eight fields are fields that are not required for transmitting the data packet, and bits, in the FHE, corresponding to the fields are set to 0. Specific fields, in the eight fields, that need to be carried and specific fields, in the eight fields, that do not need to be carried may be determined by a related device based on a type of a transmitted data service.

Step S103: The first in-domain device extracts an address from the data packet based on the address length.

In this embodiment, the address may be a source address or a destination address. The first in-domain device extracts the address from the data packet based on the address length and a start location of a field of the address. The first in-domain device may determine the start location based on the FHE field.

With reference to the embodiment shown in FIG. 3A and FIG. 3B, a length of the version field is four bits, a length of the traffic class field is eight bits, a length of the flow label field is 20 bits, a length of the payload length field is 16 bits, a length of the next header field is eight bits, a length of the hop limit field is eight bits, a length of the source address field is m bits, and a length of the destination address field is n bits. Both m and n are integers greater than 0. Values of m and n are defined in the version field.

In this application, the version field defines a relationship between source and destination addresses and the address length. Specifically, different values of the version field define source addresses with different lengths and destination addresses with different lengths.

For example, a value of the version field is 0000, indicating a source address with the address length and a destination address with a standard length. That is, m is the address length, for example, eight bits, and n is, for example, 128 bits.

A value of the version field is 0001, indicating a destination address with the address length and a source address with a standard length. That is, m is 128 bits, and n is the address length, for example, eight bits.

A value of the version field is 0010, indicating a source address with the address length and a destination address with the address length. That is, m is equal to n, and m and n each are the address length, for example, eight bits.

A value of the version field ranges from 0011 to 1111, indicating that the version field is reserved and no content is defined.

Based on this, with reference to the embodiment corresponding to FIG. 3A and FIG. 3B, the first in-domain device may determine the address based on the version field, and then determine, based on the FHE field, a plurality of fields behind the FHE field. The plurality of fields include the field corresponding to the address. Further, the first in-domain device sequentially determines a start location of each field based on the FHE field and a length of each of the plurality of fields and, therefore, can determine the start location of the field of the address.

For example, the FHE field is "11111111", and the first in-domain device may determine, based on the FHE field, that in the data packet, the eight fields in the embodiment corresponding to FIG. 3A and FIG. 3B are sequentially behind the FHE field. In this embodiment, the address is, for example, the source address. The first in-domain device may determine that the first bit to the eighth bit of the data packet are the FHE field, the ninth bit to the twelfth bit are the version field, the thirteenth bit to the twentieth bit are the traffic class field, and so on, until the first in-domain device determines that the seventy-third bit to the eighty-first bit are the source address field so that the start location of the address can be determined.

Step S104: The first in-domain device forwards the data packet based on the address.

The first in-domain device may search the routing table for the next-hop device based on the address, and then the first in-domain device may send the data packet to the next-hop device.

It can be learned that a method for defining the address length in the technical solutions of this application is not limited by a link layer protocol, and a length of any address may be defined based on a requirement. Therefore, flexibility is high, and applicability is wide. In addition, the address with the address length defined in the technical solutions of this application can be used to construct the routing table and can be used for routing and forwarding so that communication performance can be optimized.

Figures 4, 5:
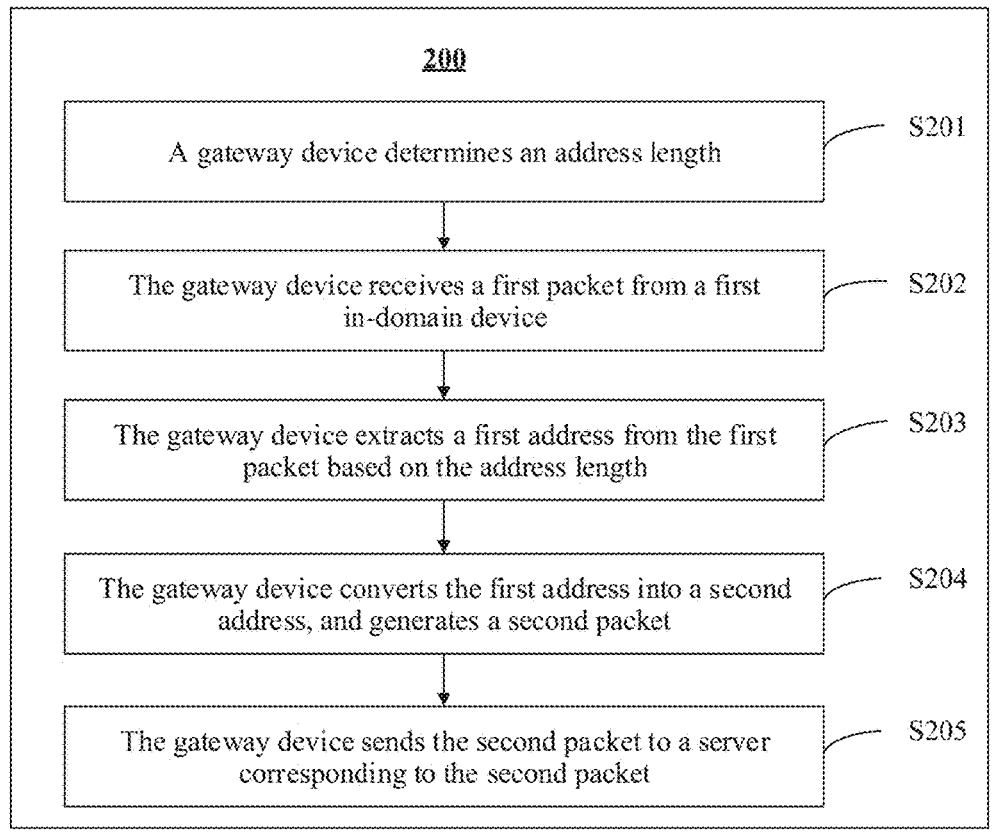
FIG. 4 is an example method flowchart of a communication method 200 according to this application.
FIG. 5 is a schematic diagram of a prefix option field of an RA message according to this application.

FIG. 4 is an example method flowchart of a communication method 200 according to this application. The communication method 200 is implemented in a scenario of in-domain to out-domain communication in this application. The communication method 200 includes the following steps.

Step S201: A gateway device determines an address length.

The gateway device is a device that connects a local area network to an external network.

According to the embodiment corresponding to FIG. 2, the address length may be determined by skilled persons, the gateway device, or an in-domain device. Correspondingly, this step includes the following several possible implementations.

In a first possible implementation, the skilled persons determine the address length. In this implementation, the gateway device receives a message, where the message includes a field indicating the address length, and the gateway device may determine the address length based on the field. The message is generated and sent by a device such as an address server that is operated by the skilled persons.

In a second possible implementation, the in-domain device determines the address length. It can be learned from that "the in-domain device determines the address length" in the communication method 100 that, the in-domain device sends, to an adjacent device, a message carrying the field indicating the address length after in-domain devices determine the address length through negotiation. The gateway device is connected to a part of in-domain devices. After the in-domain device connected to the gateway device determines the address length, the corresponding in-domain device sends a message to the gateway device, where the message includes the field indicating the address length. Correspondingly, after receiving the message, the gateway device may determine the address length based on the field.

In a third possible implementation, the gateway device determines the address length. The gateway device can learn of a total quantity of in-domain devices, and then the gateway device may determine the address length based on the total quantity of connected in-domain devices, where the total quantity is less than or equal to $2^{the\ address\ length}-1$.

Further, after determining the address length, the gateway device notifies, by using a message, an in-domain device connected to the gateway device of the address length. The message may be a router advertisement (RA) message.

FIG. 5 shows an example frame structure of an RA message according to this application. A prefix option field of the RA message includes a type field, a length field, a prefix length (|L|A|) field, and a valid lifetime field, a preferred lifetime field, a reserved (reserved 2) bit, and a prefix field. For definitions of the fields in the frame structure of the RA message, refer to descriptions in an IPv6 protocol. Details are not described herein.

In this application, the gateway device may add an address length enabling flag bit "S" to the prefix length |L|A| field in the frame structure shown in FIG. 5. "S" is used to indicate the gateway device and the in-domain device to generate an n-bit interface identifier (that is, an address) based on a prefix length (for example, 128-n, where 128-n is, for example, 120 bits) of this option. The bit is set, indicating that the device can use the n-bit address.

A value of a field "Src" (source address) in the RA message included in a configuration sent by the gateway device is "Src=uniqu local address", and a value of a field "data" in the RA message is "data=router lifetime, Cur hop limit, Autoconfig flag, Option(prefix (prefix length=120, S=1), MTU)".

Step S202: The gateway device receives a first packet from a first in-domain device.

Similar to the data packet in the foregoing embodiment, a header format of the first packet includes a dispatch field and a type-specific header field. A value of the dispatch field is used to define an address whose length is the address length and that is included in the first packet, and the value of the dispatch field is different from a value of an existing dispatch field included in a 6LoWPAN standard. A format of the type-specific header field is also that shown in FIG. 3A and includes an FHE field and header fields. For details about formats defined for the FHE field and the header fields, refer to descriptions in the embodiment corresponding to FIG. 3A and FIG. 3B. Details are not described herein again.

It may be understood that, in this embodiment, a source address field in the first packet indicates an address of the first in-domain device, and a destination address field indicates an address of a server that receives the first packet.

Step S203: The gateway device extracts a first address from the first packet based on the address length.

In this embodiment, a length of the first address is the address length. The first address is the address of the first in-domain device or the address of the server.

Similar to the communication method 100, in this embodiment, the gateway device extracts the first address from the first packet based on the address length and a start location of the first address. Similarly, the gateway device may determine the start location based on the FHE field in the first packet. An operation of determining the start location by the gateway device based on the FHE field in the first packet is similar to the operation of determining the start location by the first in-domain device based on the FHE field in the data packet, and details are not described herein again.

In some embodiments, the first address is the address (that is, a source address) of the first in-domain device. In this case, a length of the source address field in this embodiment is the address length, for example, eight bits, and a length of the destination address field is a standard address length, for example, 128 bits. Correspondingly, a value of a version field in the first packet is, for example, 0000. The gateway device can determine, based on the value of the version field, that an address indicated by the source address field needs to be extracted.

In some other embodiments, the first address is the address (that is, a destination address) of the server. In this case, a length of the source address field in this embodiment is a standard address length, for example, 128 bits. A length of the destination address field is the address length, for example, eight bits. Correspondingly, a value of a version field in the first packet is, for example, 0001. The gateway device can determine, based on the value of the version field, that an address indicated by the destination address field needs to be extracted.

Step S204: The gateway device converts the first address into a second address, and generates a second packet.

A device indicated by the first address is the same as a device indicated by the second address. The length of the first address is greater than 0 and less than or equal to a length of the second address.

In some embodiments, the gateway device may obtain the second address by adding a prefix field in front of the first address. The prefix field indicates a network segment to which the second address belongs, and the prefix field is, for example, 192.168. A length of the prefix field satisfies: the length of the second address minus a quantity of bits with the address length. The length of the second address is, for example, 128 bits, and the address length is, for example, eight bits. In this case, the length of the prefix field is 120 bits.

The prefix field may be determined and stored by the gateway device in an address configuration process. The address configuration process is described in the following embodiments of this specification, and details are not described herein.

In some other embodiments, the gateway device determines, from a first correspondence, the second address corresponding to the first address. The first correspondence includes a correspondence between at least two types of addresses that identify a same device.

The first correspondence may be created and stored by the gateway device in an address configuration process. The address configuration process is described in the following embodiments of this specification, and details are not described herein.

It may be understood that a packet sent by the gateway device in the external network should comply with the standard IPv6 protocol. Therefore, after converting the first address into the second address, the gateway device should further configure a standard IPv6 header to obtain the second packet. The standard IPv6 header includes the second address.

Step S205: The gateway device sends the second packet to a server corresponding to the second packet.

In some embodiments, the first address is the address of the first in-domain device, an address indicated by a destination address field in the second packet (also the first packet) is the address of the server, and the gateway device may send the second packet to the server based on the address indicated by the destination address field.

In some other embodiments, the first address is the address of the server. Further, after the gateway device converts the first address into the second address, the second address is used to identify the server in the external network, and the gateway device may send the second packet to the server based on the second address.

It may be understood that step S201 to step S205 describe an implementation of the communication method 200 in an implementation scenario of this application. In another implementation scenario of this application, after receiving the first packet from the first in-domain device, the gateway device may extract the first address and a third address from the first packet based on the address length, the gateway device converts the first address into the second address, converts the third address into the fourth address, and generates a third packet, and then, the gateway device may send the third packet to a server corresponding to the third packet.

In this implementation scenario, lengths of the first address and the third address each are the address length. The first address identifies the first in-domain device, and the third address identifies the server. Alternatively, the first address identifies the server, and the third address identifies the first in-domain device. In this embodiment, a value of the version field in the first packet is, for example, 0010.

In addition, in this implementation scenario, for an operation process of extracting the first address and the third address by the gateway device, refer to the embodiment corresponding to step S203. For an operation process of converting the first address and an operation process of converting the third address by the gateway device, refer to the embodiment corresponding to step S204. Details are not described herein again.

Figure 6:
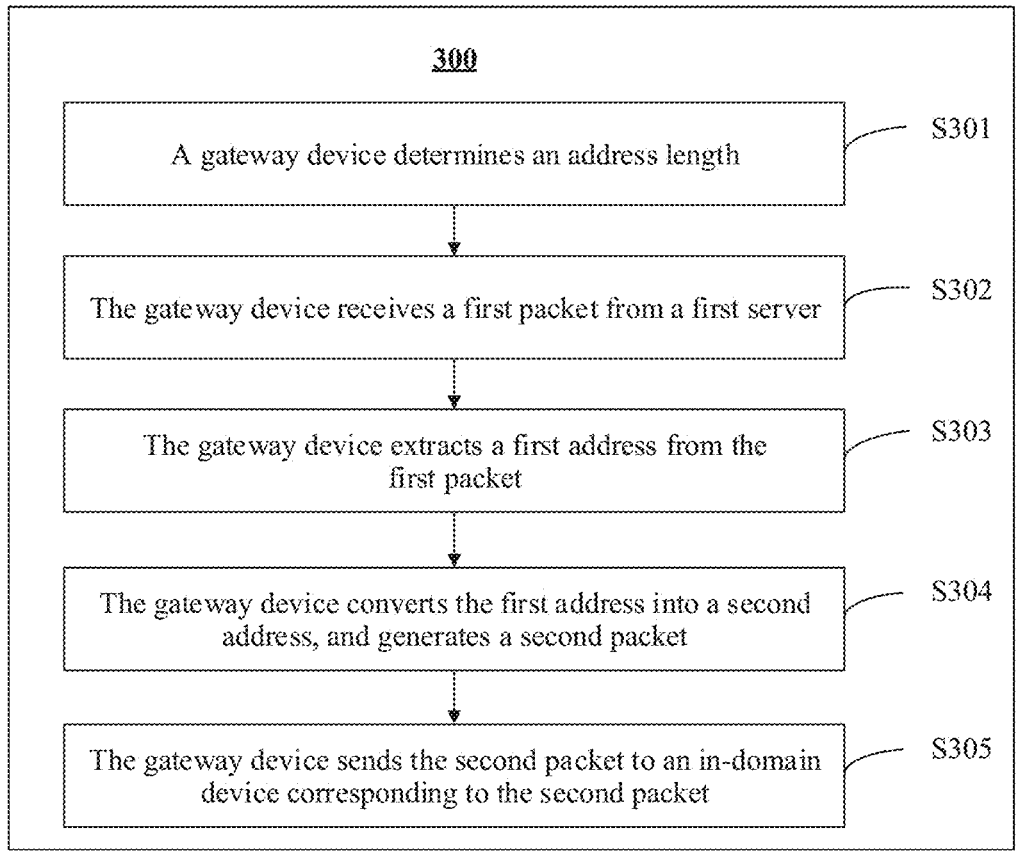
FIG. 6 is an example method flowchart of a communication method 300 according to this application.

FIG. 6 is an example method flowchart of a communication method 300 according to this application. The communication method 300 is implemented in a scenario of out-domain to in-domain communication in this application. The communication method 300 includes the following steps.

Step S301: A gateway device determines an address length.

For implementation details of this step, refer to descriptions of step S201 in the communication method 200. Details are not described herein again.

Step S302: The gateway device receives a first packet from a first server.

All addresses in the first packet in this embodiment are addresses with a standard length. The standard length is, for example, 128 bits.

In this embodiment, a header format of the first packet includes a dispatch field and a type-specific header field. A value of the dispatch field is a value that defines a standard IPv6 header, and the value of the dispatch field is, for example, 000001. The type-specific header field includes a source address field and a destination address field. In this embodiment, a source address in the first packet is an address of the first server, a destination address in the first packet is an address of an in-domain device, and the in-domain device is configured to receive a packet corresponding to the first packet.

Step S303: The gateway device extracts a first address from the first packet.

The first address is a source address (an address of a server) or a destination address (an address of an in-domain device). In this embodiment, the gateway device may directly extract the first address from the type-specific header field.

Step S304: The gateway device converts the first address into a second address, and generates a second packet.

A length of the second address is the address length. A device indicated by the first address is the same as a device indicated by the second address. In this embodiment, the length of the second address is greater than 0 and less than or equal to a length of the first address.

In some embodiments, the gateway device may truncate the last bits, with the address length, of the first address to obtain the second address. For example, the length of the first address is 128 bits, and the address length is eight bits. The gateway device may truncate the last eight bits of the first address as the second address.

In some other embodiments, the gateway device determines, from a first correspondence, the second address corresponding to the first address. The first correspondence includes a correspondence between at least two types of addresses that identify a same device.

The first correspondence may be created and stored by the gateway device in an address configuration process. The address configuration process is described in the following embodiments of this specification, and details are not described herein.

Further, the gateway device further needs to modify a field in the header format of the first packet. For example, the gateway device needs to update the value of the dispatch field based on the device indicated by the second address. An updated value of the dispatch field is different from a value of an existing dispatch field included in a 6LoWPAN standard. In addition, the gateway device adds formats, used as the type-specific header field shown in FIG. 3A, of the FHE field and the header fields to the first packet. For details about formats defined for the FHE field and the header fields, refer to descriptions in the embodiment corresponding to FIG. 3A and FIG. 3B. Details are not described herein again.

It may be understood that, in this embodiment, the gateway device may define a specific field in the added header fields based on a requirement and, correspondingly, set a value of each bit in the FHE field. In addition, the gateway device may further define a value of the version field, a length of the source address field, and a length of the destination address field in the header fields.

For example, the second address is the address of the first server. In this embodiment, the gateway device defines the length of the source address field as the address length, for example, eight bits, and the gateway device defines the length of the destination address field as the standard address length, for example, 128 bits. Correspondingly, the value, of the version field, defined by the gateway device is 0000.

For another example, the second address is the address of the in-domain device. In this embodiment, the gateway device defines the length of the source address field as the standard address length, for example, 128 bits, and the gateway device defines the length of the destination address field as the address length, for example, eight bits. Correspondingly, the value, of the version field, defined by the gateway device is 0001.

It may be understood that the gateway device modifies the field of the first packet to obtain the second packet. The second packet includes an FHE field, and the FHE field includes a field indicating the second address.

Step S305: The gateway device sends the second packet to an in-domain device corresponding to the second packet.

In some embodiments, the first address is the address of the first server, an address indicated by a destination address field in the second packet (also the first packet) is the address of the in-domain device, and the gateway device may send the second packet to the in-domain device based on the address indicated by the destination address field.

In some other embodiments, the first address is the address of the in-domain device. Further, after the gateway device converts the first address into the second address, the second address is used to identify the in-domain device in a local area network, and the gateway device may send the second packet to the in-domain device based on the second address.

It may be understood that step S301 to step S305 describe an implementation of the communication method 300 in an implementation scenario of this application. In another implementation scenario of this application, after receiving the first packet from the first server, the gateway device may extract the first address and a third address from the first packet, and then the gateway device converts the first address into the second address, converts the third address into the fourth address, and generates a third packet. The length of the second address is the address length, and a length of the fourth address is the address length. Then, the gateway device may send the third packet to an in-domain device corresponding to the third packet.

In this implementation scenario, lengths of the first address and the third address each are the standard address length. The first address identifies the first in-domain device, and the third address identifies the server. Alternatively, the first address identifies the server, and the third address identifies the first in-domain device.

In this implementation scenario, for an operation process of converting the first address and an operation process of converting the third address by the gateway device, refer to the embodiment corresponding to step S304. In this implementation scenario, for example, the gateway device defines the value of the version field as 0010.

Figure 7:
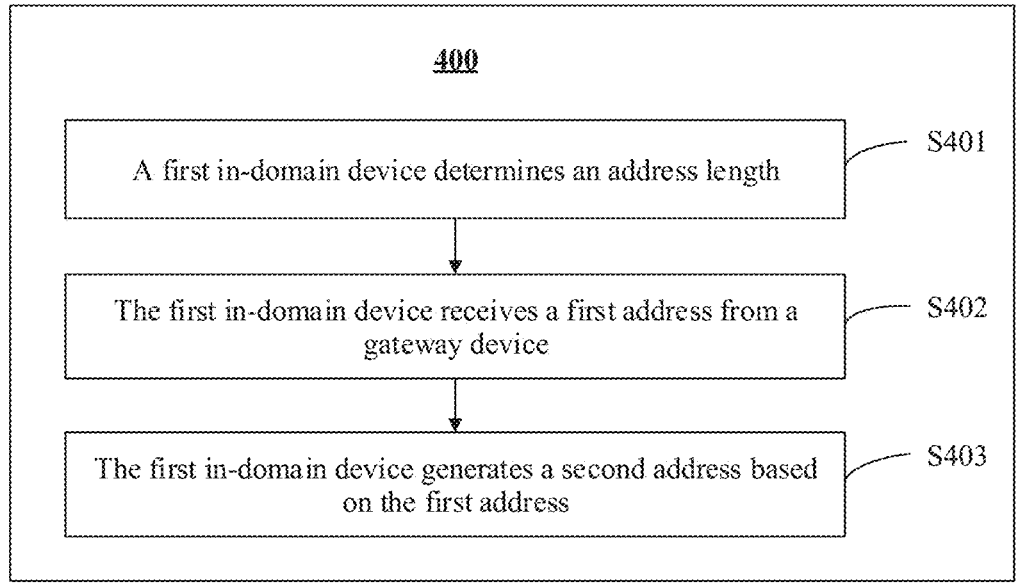
FIG. 7 is an example method flowchart of an address configuration method 400 according to this application.

FIG. 7 is an example method flowchart of an address configuration method 400 according to this application. The address configuration method 400 includes the following steps.

Step S401: A first in-domain device determines an address length.

For implementation details of this step, refer to descriptions of step S101 in the communication method 100. Details are not described herein again.

Step S402: The first in-domain device receives a first address from a gateway device.

The first address in this embodiment is an interface address of the gateway device.

Step S403: The first in-domain device generates a second address based on the first address.

A length of the second address is the address length.

After receiving the first address, the first in-domain device may detect whether a length of the first address is the address length. If the length of the first address is the address length, the first in-domain device may generate the second address based on the first address. If the length of the first address is not the address length, the first in-domain device may request the interface address from the gateway device again until a length of a received address is the address length, and use the address as the first address.

That the first in-domain device generates a second address based on the first address may be performed as follows: The first in-domain device may generate a number, and then add the number to the first address, to obtain the second address. The "number" may be a random number or a pseudo-random number, and is not limited herein.

Optionally, after adding the number to the first address, the first in-domain device may further detect whether a most significant bit of an obtained field is "1". If the most significant bit of the field is not "1", the first in-domain device may further set the most significant bit of the field to "1", to obtain the second address.

Further, after obtaining the second address, the first in-domain device further needs to detect whether the second address is occupied. If the second address is occupied, the first in-domain device generates a third address based on the first address, and a length of the third address is the address length. A method used by the first in-domain device to generate the third address based on the first address is similar to a method used by the first in-domain device to generate the second address based on the first address. Details are not described herein. If the second address is not occupied, the first in-domain device may use the second address as an address of the first in-domain device.

For example, the first in-domain device includes the second address in a neighbor solicitation (NS) message, and sends the NS to another in-domain device. If the first in-domain device receives a neighbor advertisement (NA) message from the another in-domain device, it is considered that the second address is already occupied by the corresponding in-domain device. If the first in-domain device does not receive an NA message from the another in-domain device, the first in-domain device occupies the second address, generates an NA message, and sends the NA message to the another device. In this embodiment, a value of a field "Target" in the NS message is configured as "Target=domain address". In this embodiment, a value of a field "Src" (source address) in the NA message is configured as "Src=domain address", and a value of a field "Target" (destination address) in the NA message is configured as "Target=domain address". The "domain address" is the second address.

In this application, the in-domain device detects whether an address is used by at least two devices, which is also referred to as "duplicate detection". In this specification, a process of detecting whether an address is occupied is also referred to as "duplicate detection".

Further, during implementation of this application, the first in-domain device may correspond to a preset threshold of a total quantity of duplicate detection times, and the preset threshold is, for example, 3. Based on this, in some embodiments, the first in-domain device may set an initial value of the total quantity of duplicate detection times to 0. Then, if the second address is occupied, the first in-domain device increases the total quantity of duplicate detection times by 1, and determines whether a current total quantity of duplicate detection times is equal to the preset threshold. If the current total quantity of duplicate detection times is less than the preset threshold, the first in-domain device may generate the third address based on the first address. If the current total quantity of duplicate detection times is equal to the preset threshold, the first in-domain device may output alarm information. In some other embodiments, the first in-domain device may set an initial value of the total quantity of duplicate detection times to the preset threshold. Then, if the second address is occupied, the first in-domain device subtracts 1 from the total quantity of duplicate detection times, and determines whether a current total quantity of duplicate detection times is equal to 0. If the current total quantity of duplicate detection times is not equal to 0, the first in-domain device may generate the third address based on the first address. If the current total quantity of duplicate detection times is equal to 0, the first in-domain device may output alarm information.

If addresses configured by the first in-domain device for a plurality of consecutive times are occupied, it indicates that address space is insufficient. The gateway device or another address configuration server (for example, a dynamic host configuration protocol (DHCP) server) may reset a longer address length to increase the address space. Further, the first in-domain device repeatedly performs the foregoing address configuration method. It should be noted that, after the address length is updated, the preset threshold of the total quantity of duplicate detection times corresponding to the first in-domain device is recovered to the initial set value.

In the address configuration method 400, configuring an address by an in-domain device is described. In the technical solutions of this application, the gateway device may also perform address configuration.

For example, after determining the address length, the gateway device may generate an address pool, where the address pool includes at least one address, and a length of the at least one address is the address length. Then, the at least one address is notified to an in-domain device. After determining that the received address is not occupied, the in-domain device uses the received address as an address of the in-domain device. For an operation process in which the in-domain device determines whether the received address is occupied, refer to the descriptions in the foregoing embodiments. Details are not described herein again.

For another example, after determining the address length, the gateway device receives an address delegate request sent by the first in-domain device, where the address delegate request includes the first address, and the length of the first address is a standard address length. The gateway device generates the second address corresponding to the first address, stores a correspondence between the first address and the second address, and notifies the first in-domain device of the second address. After determining that the second address is not occupied, the first in-domain device uses the second address as the address of the first in-domain device. For an implementation process in which the in-domain device determines whether the received address is occupied, refer to the descriptions in the foregoing embodiments. Details are not described herein again.

In this embodiment, the gateway device may maintain a correspondence between a delegate address (an address with the address length) and a delegated address (with the standard address length) so that the gateway device uses the correspondence to convert the address when performing the method 200 and the method 300. The correspondence corresponds to the first correspondence in the method 200 and the method 300.

In addition, in this embodiment, the first in-domain device sends the address delegate request to the gateway device by using a router solicitation (RS) message, a "Data" field in the RS message carries the first address, and a value of the "Data" field is "Data=options(Dst proxy rep (2001 . . . 25de . . . cade))". "2001 . . . 25de cade" is the first address. After configuring the second address, the gateway device may notify the first in-domain device of the second address by using an RA message. In this embodiment, a value of a "Src" field in the RA message is "Src=router unique local address", and the "unique local address" is the second address. A value of a "Data" field in the RA message is "Data=router lifetime, Cur hop limit, Autoconfig flag, Options (Dst proxy rsp)".

In conclusion, in the technical solutions of this application, a related device first determines a length of a compressed address and may further extract an address from a packet based on the address length after receiving the packet. Then, the related device performs a subsequent operation based on the extracted address. It can be learned that the solution is not limited by a link layer transmission protocol, has a flexible operation manner, and has wide applicability, and communication performance can be improved.

For example, the following describes the technical solutions of this application with reference to examples.

Figure 8:
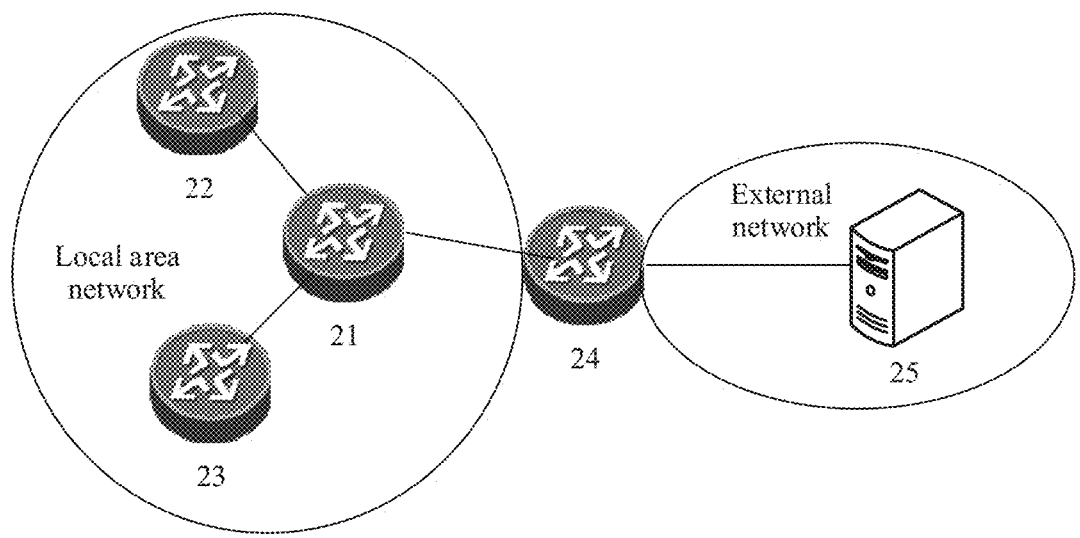
FIG. 8 is a schematic structural diagram of an example of an internet of things 20 according to this application.

FIG. 8 is a structural diagram of an example of an internet of things 20. The internet of things 20 includes an in-domain device 21, an in-domain device 22, an in-domain device 23, a gateway device 24, and a server 25. The in-domain device 21, the in-domain device 22, and the in-domain device 23 are located in a local area network, and the in-domain device 21 is connected to the in-domain device 22 and the in-domain device 23. The in-domain device 21 is connected to the gateway device 24, and can forward a message and a packet that are sent by the gateway device 24 to the in-domain device 22 and the in-domain device 23. The gateway device 24 is connected to the in-domain device 21 and the server 25, can forward a packet of the in-domain device 21 to the server 25, and can forward a packet of the server 25 to the in-domain device 21. The server 25 is, for example, an IPv6 server. Devices in the internet of things 20 communicate with each other based on, for example, an IPv6 protocol.

It may be understood that the internet of things 20 shown in FIG. 8 is merely an example for description, and FIG. 8 does not constitute a limitation on the internet of things 20. In some other embodiments, the internet of things 20 may further include a different quantity of device entities from that in the foregoing embodiments. Further, a connection manner of the device entities may also be different from that in the foregoing embodiments.

Determine an Address Length:

In this application, after the devices in the internet of things 20 establish the connections shown in FIG. 8, an address needs to be configured for each of the devices so that the devices can communicate with each other. Before the address is configured, an address length n may be first determined in this application. The address length n is, for example, less than 128 bits. The address length n is, for example, eight bits.

It should be noted that a standard IPv6 address should be used for a source address and a destination address of a packet transmitted in an external network. A length of the standard IPv6 address is 128 bits. Based on this, the address length n described in this application is a length of an address in a packet transmitted in a domain.

In this embodiment, the address length n may be determined in the following manners.

Manner 1: Skilled persons determine the address length n through a device such as an address server, and then the skilled persons control a corresponding device to generate a preconfiguration message, where the preconfiguration message includes a field indicating the address length n. Further, the skilled persons control the corresponding device to send the preconfiguration message to the in-domain device 21, the in-domain device 22, the in-domain device 23, and the gateway device 24. The in-domain device 21, the in-domain device 22, the in-domain device 23, and the gateway device 24 separately determine the address length n from the preconfiguration message.

Manner 2: The gateway device 24 determines the address length n based on a total quantity 3 of in-domain devices so that $2^n-1$ is greater than or equal to 3. Then, the gateway device 24 may generate a message, where the message includes a field indicating the address length n. Then, the gateway device 24 notifies the in-domain device 21 of the message. Further, the in-domain device 21 sends the message to the in-domain device 22 and the in-domain device 23. In this embodiment, the message may be an RA message. In this embodiment, for a format of a prefix option of the RA message, and a field and a value of the RA message, refer to the descriptions in the embodiment corresponding to the method 200. Details are not described herein again.

Manner 3: An address length preset in the in-domain device 21 is, for example, six bits, an address length preset in the in-domain device 22 is, for example, eight bits, and an address length preset in the in-domain device 23 is, for example, four bits. Further, the in-domain device 22 sends an address length of eight bits to the in-domain device 21 by using a message. The in-domain device 21 determines that eight bits are greater than six bits. Further, the in-domain device 21 determines that an address length of the in-domain device 21 is eight bits, and sends the message to the in-domain device 23 and the gateway device 24.

In this implementation, when the in-domain device 22 sends the address length 8 to the in-domain device 21 by using the message, the in-domain device 21 also sends the address length 6 to the in-domain device 22. The in-domain device 22 also selects a longer address length as an address length of the in-domain device 22. Similarly, another in-domain device sends the address length of the in-domain device to an in-domain device connected to the another in-domain device, and receives an address length message of the in-domain device connected to the another in-domain device. Details are not described herein again.

Configure an Address:

After the address length n is determined, addresses used by the in-domain device 21, the in-domain device 22, and the in-domain device 23 in the domain are configured. The in-domain device 21 is used as an example. The address used by the in-domain device 21 in the domain may include a device address of the in-domain device 21. In addition, if the in-domain device 21 needs to access the server 25, the in-domain device 21 further needs to use an address of the server 25 in the domain. Similarly, the address used by the in-domain device 22 in the domain may include a device address of the in-domain device 22 and, optionally, may also include the address of the server 25. The address used by the in-domain device 23 in the domain may include a device address of the in-domain device 23 and, optionally, may also include the address of the server 25.

Based on this, in some embodiments, the device addresses used by the in-domain device 21, the in-domain device 22, and the in-domain device 23 in the domain may be configured as addresses with a length of eight bits. The server address used by the in-domain device 21, the in-domain device 22, and the in-domain device 23 in the in-domain is configured as a standard IPv6 address, that is, 128 bits. In some other embodiments, the server address used by the in-domain device 21, the in-domain device 22, and the in-domain device 23 in the domain may be configured as an address with a length of eight bits. The device addresses used by the in-domain device 21, the in-domain device 22, and the in-domain device 23 in the in-domain are configured as standard IPv6 addresses, that is, 128 bits. In some other embodiments, the device addresses and the server address that are used by the in-domain device 21, the in-domain device 22, and the in-domain device 23 in the domain may be all configured as addresses with a length of eight bits.

In this embodiment, an address with a length of eight bits may be configured in the following manners.

Manner 1: The in-domain device 21 is used as an example. The in-domain device 21 receives a first address from the gateway device 24, where a length of the first address is, for example, eight bits. For example, the in-domain device 21 generates a pseudo-random number, and then the in-domain device 21 adds the pseudo-random number to the first address to obtain a second address, where a length of the second address is eight bits. The first address is an address of the gateway device 24 generated after the gateway device determines that the address length is eight bits.

When the in-domain device 21 adds the pseudo-random number to the first address, if an obtained field is greater than eight bits, other numbers in a first address field are ignored, to ensure that the obtained field is eight bits. In addition, after adding the pseudo-random number to the first address, the in-domain device 21 may further detect whether a most significant bit of the obtained field is "1". If the most significant bit of the field is not "1", the in-domain device 21 may set the most significant bit of the field to "1" to obtain the second address.

An address configuration manner of the in-domain device 22 and the in-domain device 23 is similar to that of the in-domain device 21. Likewise, another address field is generated based on the first address. Details are not described herein again.

Manner 2: The gateway device 24 generates an address pool, where the address pool may include three addresses, and lengths of the three addresses are all eight bits. Then, the gateway device 24 notifies the in-domain device 21 of the three addresses. The in-domain device 21 sends the 1st address in the three addresses to the in-domain device 22 and sends the 2nd address in the three addresses to the in-domain device 23.

Manner 3: The gateway device 24 may receive an address delegate request of the in-domain device 21, where the address delegate request includes at least one 128-bit address. The gateway device 24 separately generates an address corresponding to the at least one 128-bit address, to obtain at least one 8-bit address, where the at least one 8-bit address is a delegate address. The gateway device 24 stores a correspondence between the at least one 128-bit address and the at least one 8-bit address and notifies the in-domain device 21 of the at least one 8-bit address.

A manner in which the gateway device 24 acts as a delegate to the address of the in-domain device 22 and the in-domain device 23 is similar to an operation manner in which the gateway device 24 acts as a delegate to the in-domain device 21, and details are not described herein again.

If the in-domain device 21, the in-domain device 22, and the in-domain device 23 are all corresponding to the server 25, after an 8-bit address may be configured in a network segment in the manner 1 and/or the manner 2, the gateway device 24 may request, from the server 25, at least one 128-bit address that belongs to one network segment. Then, the gateway device 24 truncates and stores a field with the first 120 bits of any one of 128-bit addresses as a prefix field. The prefix field is used to convert addresses with different lengths.

Optionally, during actual application, if a device address with a length of eight bits is configured, the manner 1 or the manner 2 may be preferentially used. If a server address with a length of eight bits is configured, the manner 3 may be preferentially used.

Duplicate Address Detection:

Before using an 8-bit address, the in-domain device 21, the in-domain device 22, and the in-domain device 23 each detect whether a received address is occupied. If the corresponding address is occupied, a corresponding in-domain device triggers configuration of a new 8-bit address. If the corresponding address is not occupied, a corresponding in-domain device uses the received address.

The in-domain device 21 is used as an example. The in-domain device 21 obtains an address 1 (that is, the foregoing generated second address or an address notified by the gateway device), and a length of the address 1 is eight bits. The in-domain device 21 may generate an NS message, where the NS message carries the address 1. The in-domain device 21 may multicast the NS message to the in-domain device 22 and the in-domain device 23. If the in-domain device 21 receives an NA message from the in-domain device 22 and/or the in-domain device 23, it indicates that the address 1 is occupied, and the in-domain device 21 may reconfigure an 8-bit address based on the foregoing address configuration operation. If the in-domain device 21 does not receive an NA message, it indicates that the address 1 is not occupied, and the in-domain device 21 may use the address 1. Further, the in-domain device 21 may further generate an NA message, where the NA message carries the address 1. Then, the in-domain device 21 sends the NA message to the in-domain device 22 and the in-domain device 23, to notify the in-domain device 22 and the in-domain device 23 that the address 1 is occupied.

For formats of the NS message and the NA message, refer to the descriptions in the embodiment corresponding to the method 400. Details are not described herein again. A manner in which the in-domain device 22 and the in-domain device 23 perform duplicate address detection is similar to that of the in-domain device 21, and details are not described herein again.

In addition, because the address length is predetermined in this application, and then the address is configured based on the address length, address space may be insufficient. Based on this, the in-domain device 21, the in-domain device 22, and the in-domain device 23 may preset a threshold of a quantity of duplicate detection times. A quantity of consecutive duplicate detection times of any in-domain device based on an address length exceeds the threshold, and the in-domain device sends alarm information, to trigger a related device that determines the address length to reconfigure the address length.

For example, the threshold of the quantity of duplicate detection times is 3, and an initial quantity of duplicate detection times of the in-domain device 21 is 0. In this case, in a scenario in which the address length is eight bits, after the in-domain device 21 receives the NA message indicating that the address 1 is occupied, the total quantity of duplicate detection times is increased by 1 to obtain that a current total quantity of duplicate detection times is 1. Further, the in-domain device 21 obtains an address 2. If an NA message carrying the address 2 is received, the total quantity of duplicate detection times is increased by 1 again to obtain that the current total quantity of duplicate detection times is 2. Further, the in-domain device 21 obtains an address 3. If an NA message carrying the address 3 is received, the total quantity of duplicate detection times is increased by 1 again, to obtain that the current total quantity of duplicate detection times is 3. Then, the in-domain device 21 sends alarm information.

Further, skilled persons or the gateway device may reconfigure the address length. For example, the reconfigured address length is 10 bits. Then, the in-domain device 21, the in-domain device 22, the in-domain device 23, and the gateway device 24 repeatedly perform the foregoing three steps until addresses used by the in-domain device 21, the in-domain device 22, and the in-domain device 23 in the domain and out of the domain are configured.

Certainly, the foregoing operation of performing duplicate detection by the in-domain device 21 is merely an optional example of this application. In another implementation of this application, an initial quantity of duplicate detection times of the in-domain device 21 is 3. In this case, in a scenario in which the address length is eight bits, after the in-domain device 21 receives the NA message indicating that the address 1 is occupied, the total quantity of duplicate detection times is decreased by 1, to obtain that a current total quantity of duplicate detection times is 2. Further, the in-domain device 21 obtains an address 2. If an NA message carrying the address 2 is received, the total quantity of duplicate detection times is decreased by 1 again, to obtain that the current total quantity of duplicate detection times is 1. Further, the in-domain device 21 obtains an address 3. If an NA message carrying the address 3 is received, the total quantity of duplicate detection times is decreased by 1 again to obtain that the current total quantity of duplicate detection times is 0. Then, the in-domain device 21 sends alarm information.

After addresses used by the in-domain device 21, the in-domain device 22 and the in-domain device 23 in the domain and out of domain are configured, the internet of things 20 may perform communication based on the configured addresses.

It may be understood that after the internet of things 20 establishes a connection, a transmission mode of a packet in the internet of things 20 may be set. For example, it is set that a packet is forwarded by using a destination address as a reference. In this case, in a process of transmitting any packet, a related forwarding device of the internet of things 20 extracts a destination address from the packet. For another example, it is set that a packet is forwarded by using a source address as a reference. In this case, in a process of transmitting any packet, a related forwarding device of the internet of things 20 extracts a source address from the packet. In this embodiment, for example, a packet is forwarded by using a destination address as a reference.

In-Domain Packet Forwarding:

It should be noted that, after determining that the address length is eight bits, the in-domain device 21, the in-domain device 22, and the in-domain device 23 may construct a routing table based on 8-bit length information, where the routing table is used to route and forward a packet in a local area network.

For example, the in-domain device 21 receives a packet sent by the in-domain device 22, and forwards the packet to the in-domain device 23. After receiving the packet, the in-domain device 21 determines a start location of an address field of the in-domain device 23 based on an FHE field in the packet. Then, the in-domain device 21 may extract an address of the in-domain device 23 from the packet based on the address length of 8 bits and the determined start location. Further, the in-domain device 21 determines, from the routing table based on the extracted address, that a next-hop device is the in-domain device 23, and further forwards the packet to the in-domain device 23.

Asymmetric Address Conversion:

When the packet is transmitted in the domain, at least one 8-bit address is used. When the packet is transmitted out of the domain, two 128-bit addresses are used. In this application, addresses, with different lengths, used for the packet in the domain and out of the domain, and source addresses and destination addresses, with different lengths, used when the packet is transmitted in the domain are referred to as "asymmetric addresses".

Based on a transmission mechanism in this application, in a process in which a packet sent by the server 25 to the in-domain device 21 is transmitted between the server 25 and the gateway device 24, a source address and a destination address in the packet are 128-bit standard addresses. However, in a process in which the packet is transmitted between the gateway device and the in-domain device 21, at least one address in the packet needs to be an 8-bit address. Similarly, in a process in which a packet sent by the in-domain device 21 to the server 25 is transmitted between the in-domain device 21 and the gateway device 24, at least one address in the packet needs to be an 8-bit address. However, in a process in which the packet is transmitted between the gateway device and the server 25, a source address and a destination address in the packet are 128-bit standard addresses. Based on this, in this application, the gateway device 24 converts an in-domain address format and an out-domain address format by using an address conversion mechanism.

For example, the in-domain device 21 transmits a packet 1 to the server 25, and a source address (that is, an address of the in-domain device 21) and a destination address (that is, an address of the server 25) in the packet 1 have eight bits. After receiving the packet 1, the gateway device 24 extracts the source address and the destination address, converts the source address into a standard source address, and converts the destination address into a standard destination address. The source address is, for example, configured in the foregoing manner 1, and the destination address is, for example, configured in the foregoing manner 3. In this case, the gateway device 24 stores a prefix field corresponding to the source address and a correspondence. Further, the gateway device 24 may obtain the standard source address by adding the prefix field in front of the source address. The gateway device 24 may search the correspondence for the standard destination address corresponding to the destination address. After determining the standard source address and the standard destination address, the gateway device 24 reconstructs a header format of the packet 1 based on an IPv6 standard, to obtain a packet 2. The packet 2 carries the standard source address and the standard destination address in a standard IPv6 format. Then, the gateway device 24 sends the packet 2 to the server 25.

For another example, the server 25 transmits a packet 3 to the in-domain device 21, where a source address (that is, an address of the server 25) and a destination address (that is, an address of the in-domain device 21) in the packet 3 are 128-bit standard addresses. After receiving the packet 3, the gateway device 24 extracts the source address and the destination address and may convert at least the standard destination address into an 8-bit address. The 8-bit destination address is, for example, configured in the foregoing manner 1. In this case, the gateway device 24 may truncate the last eight bits of the standard destination address as the 8-bit destination address. Further, the gateway device 24 reconstructs a header format of the packet 3 based on the field formats shown in FIG. 3A and FIG. 3B to obtain a packet 4. The field formats shown in FIG. 3A and FIG. 3B include a field of an 8-bit destination address, and a value defined in the version field can indicate a length of the 8-bit destination address. Then, the gateway device 24 sends the packet 4 to the in-domain device 21.

It may be understood that the packet 3 and the packet 4 are merely schematic descriptions of this application and constitute no limitation on the technical solutions of this application. In some other implementations of this application, the gateway device 24 may further convert the standard source address into an 8-bit source address, and a conversion method may be, for example, removing a prefix field of the standard source address. This is not limited in this application.

It may be understood that the embodiment shown in FIG. 8 is merely an example for describing the technical solutions of this application, and constitutes no limitation on the technical solutions of this application. A low-power network used in this application is not limited to the internet of things, and may alternatively be another network that needs to perform communication by using a technical idea of this application. Correspondingly, a quantity of device entities in the low-power network and a connection manner of each device entity are not limited to those shown in FIG. 8. In addition, the data in the foregoing embodiments, for example, "eight bits", is merely an example for description. The technical solutions of this application are not limited thereto. In some other embodiments, the address length shown in this application may be any value greater than 0 and less than or equal to the standard address length, for example, 10 or 12. Details are not described herein again.

In conclusion, in the communication method and the address configuration method provided in this application, the related device first determines a length of a compressed address, and may further extract an address from a data packet based on the address length after receiving the data packet. Then, the related device performs a subsequent operation based on the extracted address. It can be learned that the solution is not limited by a link layer transmission protocol, has a flexible operation manner and has wide applicability and communication performance can be improved.

In the foregoing embodiments provided in this application, the solutions of the communication method and the address configuration method provided in the embodiments of this application are separately described from a perspective of the devices and from a perspective of interaction between the devices. For example, to implement the foregoing functions, the devices include corresponding hardware structures and/or software modules for performing the functions. Persons skilled in the art should easily be aware that, in combination with the units and algorithm steps in the examples described in the embodiments disclosed in this specification, this application can be implemented by hardware or a combination of hardware and computer software. Whether a function is performed by hardware or hardware driven by computer software depends on particular applications and design constraint conditions of the technical solutions. Persons skilled in the art may use different methods to implement the described functions for each particular application, but it should not be considered that the implementation goes beyond the scope of this application.

For example, if the foregoing device implements a corresponding function by using a software module, the in-domain device may include a processing module and a transceiver module. The transceiver module may be configured to perform receiving and sending operations of the in-domain device in the method 100 and the method 400. The processing module may be configured to perform an operation of the in-domain device other than receiving and sending operations in the method 100 and the method 400.

Figure 9A:
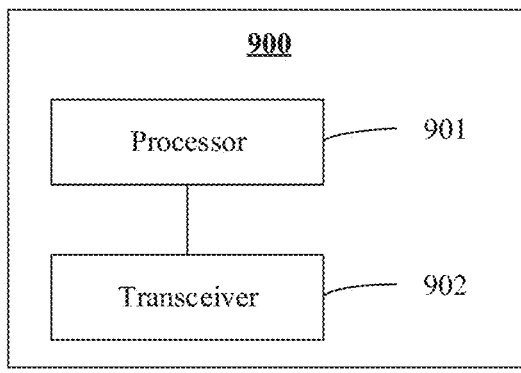
FIG. 9A is a schematic structural diagram of an example of an in-domain device 900 according to this application.

It may be understood that division of the foregoing modules is merely logical function division. During actual implementation, a function of the transceiver module may be integrated into a transceiver, and a function of the processing module may be integrated into a processor for implementation. As shown in FIG. 9A, FIG. 9A is a schematic structural diagram of an example of an in-domain device 900 according to this application. The in-domain device 900 includes a processor 901 and a transceiver 902. The transceiver 902 may perform packet and message receiving and sending in the method 100, the method 400, and the embodiment corresponding to FIG. 8. The processor 901 may perform an operation other than packet and message receiving and sending in the method 100, the method 400, and the embodiment corresponding to FIG. 8.

For example, in an embodiment, the processor 901 may be configured to determine an address length. The transceiver 902 may be configured to receive a data packet. In this embodiment, the processor 901 is further configured to extract an address from the data packet based on the address length. The transceiver 902 is further configured to forward the data packet based on the address.

In another embodiment, the processor 901 may be configured to determine an address length. The transceiver 902 may be configured to receive a first address from a gateway device, where a length of the first address is the address length. In this embodiment, the processor 901 may be further configured to generate a second address based on the first address, where a length of the second address is the address length.

For specific content, refer to descriptions of the method 100, the method 400, and related parts in the embodiment corresponding to FIG. 8. Details are not described herein again.

Figure 9B:
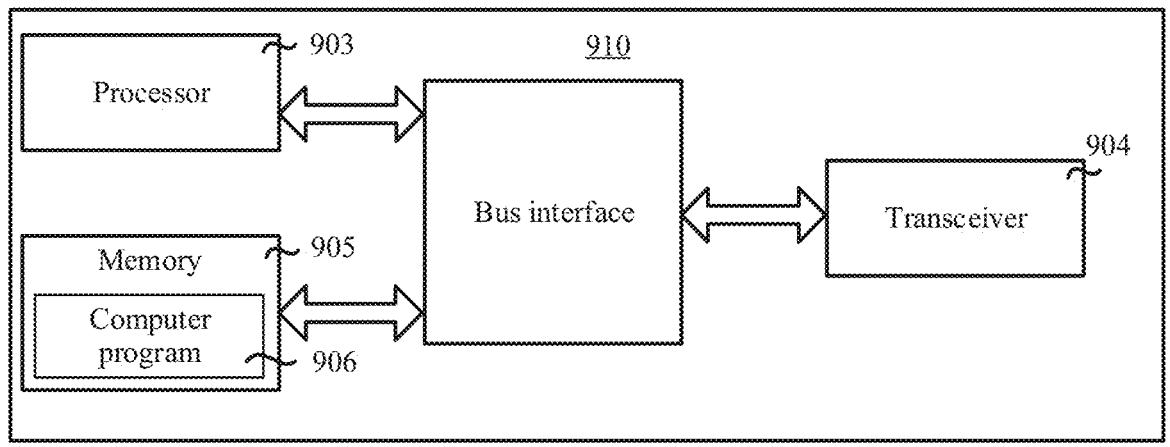
FIG. 9B is a schematic structural diagram of an example of an in-domain device 910 according to this application.

Corresponding to the in-domain device 900 shown in FIG. 9A, this application further provides an in-domain device. As shown in FIG. 9B, FIG. 9B is a schematic structural diagram of an example of an in-domain device 910 according to this application. The in-domain device 910 may include a processor 903, a transceiver 904, and a memory 905. As shown in FIG. 9B, the memory 905 is configured to be coupled to the processor 903, and stores a computer program 906 that is necessary for the in-domain device 910.

It should be understood that the in-domain device 910 in this application may correspond to the in-domain device in the method 100, the method 400, and the embodiment corresponding to FIG. 8 in this application. The transceiver 904 is configured to perform packet and message receiving and sending in the method 100, the method 400, and the embodiment corresponding to FIG. 8. The processor 903 is configured to perform processing of the in-domain device other than packet and message receiving and sending in the method 100, the method 400, and the embodiment corresponding to FIG. 8. Details are not described herein again.

For another example, the gateway device may include a processing module and a transceiver module. The transceiver module may be configured to perform receiving and sending operations of the gateway device in the method 200, the method 300, and the embodiment shown in FIG. 8. The processing module may be configured to perform an operation of the gateway device other than the receiving and sending operations in the method 200, the method 300, and the embodiment shown in FIG. 8.

Figure 10A:
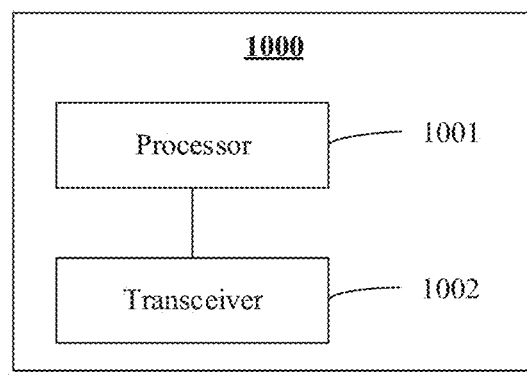
FIG. 10A is a schematic structural diagram of an example of a gateway device 1000 according to this application.

It may be understood that division of the foregoing modules is merely logical function division. During actual implementation, a function of the transceiver module may be integrated into a transceiver, and a function of the processing module may be integrated into a processor for implementation. As shown in FIG. 10A, FIG. 10A is a schematic structural diagram of an example of a gateway device 1000 according to this application. The gateway device 1000 includes a processor 1001 and a transceiver 1002. The transceiver 1002 may perform packet and message receiving and sending in the method 200, the method 300, and the embodiment shown in FIG. 8. The processor 1001 may perform an operation other than packet and message receiving and sending in the method 200, the method 300, and the embodiment shown in FIG. 8.

For example, in an embodiment, the processor 1001 may be configured to determine an address length. The transceiver 1002 may be configured to receive a first packet from a first in-domain device. In this embodiment, the processor 1001 is further configured to extract a first address from the first packet based on the address length and is further configured to: convert the first address into a second address and generate a second packet. The transceiver 1002 is further configured to send the second packet to a server corresponding to the second packet.

In another embodiment, the processor 1001 may be configured to determine an address length. The transceiver 1002 may be configured to receive a first packet from a first server. In this embodiment, the processor 1001 may be further configured to extract a first address from the first packet, and is further configured to: convert the first address into a second address, and generate a second packet, where a length of the second address is the address length. The transceiver 1002 is further configured to send the second packet to an in-domain device corresponding to the second packet.

For specific content, refer to descriptions of the method 200, the method 300, and related parts in the embodiment shown in FIG. 8. Details are not described herein again.

Figure 10B:
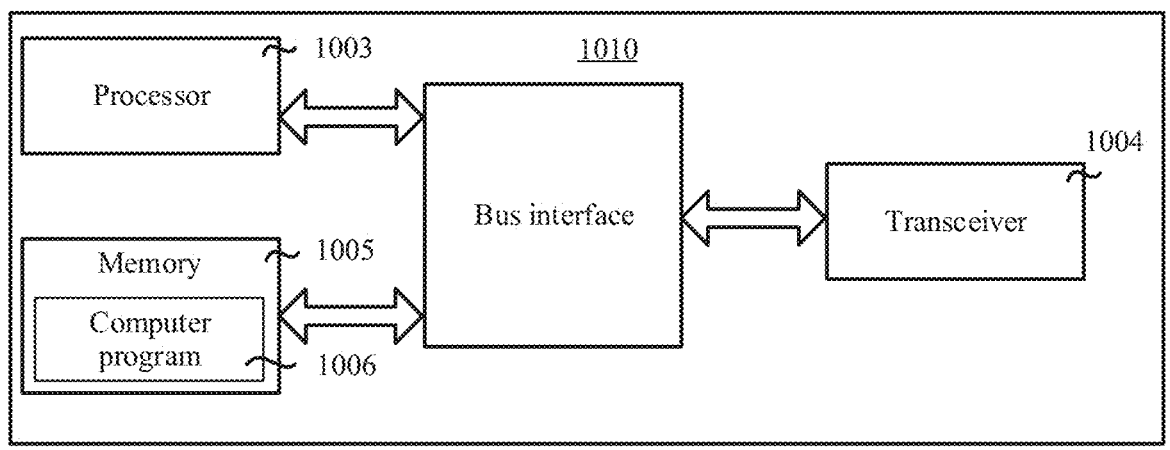
FIG. 10B is a schematic structural diagram of an example of a gateway device 1010 according to this application.

Corresponding to the gateway device 1000 shown in FIG. 10A, this application further provides a gateway device. As shown in FIG. 10B, FIG. 10B is a schematic structural diagram of an example of a gateway device 1010 according to this application. The gateway device 1010 may include a processor 1003, a transceiver 1004, and a memory 1005. As shown in FIG. 10B, the memory 1005 is configured to be coupled to the processor 1003 and stores a computer program 1006 that is necessary for the gateway device 1010.

It should be understood that the gateway device 1010 in this application may correspond to the gateway device in the method 200, the method 300, and the embodiment shown in FIG. 8 in this application. The transceiver 1004 is configured to perform packet and message receiving and sending in the method 200, the method 300, and the embodiment shown in FIG. 8. The processor 1003 is configured to perform processing of the gateway device other than packet and message receiving and sending in the method 200, the method 300, and the embodiment shown in FIG. 8. Details are not described herein again.

During specific implementation, corresponding to an in-domain device and a gateway device, this application further separately provides a computer storage medium. The computer storage medium disposed in any device may store a program. When the program is executed, some or all of the steps in the embodiments including the communication method and the address configuration method provided in FIG. 2 to FIG. 8 may be implemented. A storage medium in any device may be a magnetic disk, an optical disc, a read-only memory (ROM), a random access memory (RAM), or the like.

The transceiver in this application may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof. The processor may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable logic gate array (FPGA), a generic array logic (GAL), or any combination thereof. The memory may include a volatile memory, for example, a random access memory (random-access memory, RAM); the memory may also include a non-volatile memory, for example, a read-only memory (ROM), a flash memory, a hard disk drive (HDD), or a solid-state drive (SSD); and the memory may further include a combination of the foregoing types of memories.

A bus interface may be further included in FIG. 9B and FIG. 10B. The bus interface may include any quantity of interconnected buses and bridges, and specifically links various circuits of one or more processors represented by a processor and memories represented by a memory. The bus interface may further link together various other circuits such as a peripheral device, a voltage regulator, and a power management circuit. This is well known in the art and, therefore, is not further described in this specification. The bus interface provides an interface. The transceiver provides a unit configured to communicate with various other devices on a transmission medium. The processor is responsible for managing a bus architecture and normal processing. The memory may store a packet used when the processor is performing an operation.

Persons skilled in the art may further understand that various illustrative logical blocks and steps that are listed in the embodiments of this application may be implemented by using electronic hardware, computer software, or a combination thereof. Whether the functions are implemented by using hardware or software depends on particular applications and a design requirement of the entire system. Persons skilled in the art may use various methods to implement the described functions for each particular application, but it should not be considered that the implementation goes beyond the scope of the embodiments of this application.

The various illustrative logical units and circuits described in the embodiments of this application may implement or operate the described functions through a general-purpose processor, a digital signal processor, an application-specific integrated circuit (ASIC), a field-programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk drive, a removable magnetic disk, a CD-ROM, or a storage medium of any other form in the art. For example, the storage medium may be connected to the processor so that the processor can read information from the storage medium and write information into the storage medium. Optionally, the storage medium may alternatively be integrated into the processor. The processor and the storage medium may be disposed in an ASIC, and the ASIC may be disposed in UE. Optionally, the processor and the storage medium may be disposed in different components of the UE.

It should be understood that sequence numbers of the processes do not mean execution sequences in various embodiments of this application. The execution sequences of the processes need to be determined based on functions and internal logic of the processes, and do not need to be construed as any limitation on the implementation processes of the embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or packet center to another website, computer, server, or packet center in a wired (for example, a coaxial cable, an optical fiber, or a digital subscriber line (DSL)) or wireless (for example, infrared, radio, or microwave) manner. The computer-readable storage medium may be any usable medium accessible by a computer, or a packet storage device, such as a server or a packet center, integrating one or more usable media. The usable medium may be a magnetic medium (for example, a floppy disk, a hard disk drive, or a magnetic tape), an optical medium (for example, a DVD), or a semiconductor medium (for example, a solid-state drive (SSD)), or the like.

The embodiments in this specification are all described in a progressive manner, for same or similar parts in the embodiments, refer to these embodiments, and each embodiment focuses on a difference from other embodiments. Especially, apparatus and system embodiments are basically similar to a method embodiment, and therefore are described briefly. For related parts, refer to descriptions in the method embodiment.

In addition, ordinal numbers such as "first" and "second" mentioned in this application are used to distinguish between a plurality of objects that have a same attribute but include different content.

Although preferred embodiments of this application have been described, persons skilled in the art can make additional changes and modifications to these embodiments once they learn the basic inventive concept. Therefore, the following claims are intended to be construed as to cover the preferred embodiments and all changes and modifications falling within the scope of this application.

Clearly, persons skilled in the art can make various modifications and variations to this application without departing from the spirit and scope of this application. In this way, this application is intended to cover these modifications and variations of this application provided that they fall within the scope of the claims of this application and equivalent technologies thereof

What is claimed is:

1. A communication method, wherein the method comprises:
   determining, by a first in-domain device, an address length;
   receiving, by the first in-domain device, a data packet;
   extracting, by the first in-domain device, an address from the data packet based on the address length and a start location of a field of the address, wherein the start location of the field of the address is determined based on a flexible header encoding (FHE) field of the data packet, and wherein the FHE field comprises a plurality of bits, each of the plurality of bits corresponding to one of a plurality of header fields of the data packet and indicating whether a corresponding header field is carried in the data packet; and
   forwarding, by the first in-domain device, the data packet based on the address.

2. The communication method according to claim 1, wherein the determining, by a first in-domain device, an address length comprises:

receiving, by the first in-domain device, a message, wherein the message comprises a field indicating an address length; and determining, by the first in-domain device, the address length based on the address length indicated by the field.

3. The communication method according to claim 2, comprising:

receiving, by the first in-domain device, a preconfiguration message, wherein the preconfiguration message comprises the field indicating the address length; and determining, by the first in-domain device, the address length indicated by the field as the address length.

4. The communication method according to claim 2, comprising:

receiving, by the first in-domain device, the message from a gateway device, wherein the message comprises the field indicating the address length; and determining, by the first in-domain device, the address length indicated by the field as the address length.

5. The communication method according to claim 2, comprising:

receiving, by the first in-domain device, the message from a second in-domain device, wherein the message comprises the field indicating the address length, and the first in-domain device and the second in-domain device are connected to each other; and determining, by the first in-domain device, the address length indicated by the field as the address length.

6. The communication method according to claim 2, comprising:

determining, by the first in-domain device, an address length preset in the first in-domain device as a first length; and receiving, by the first in-domain device, a message from a second in-domain device, wherein the message comprises a field indicating a second length, the second length is an address length preset in the second in-domain device, and the first in-domain device and the second in-domain device are connected to each other;

determining, by the first in-domain device based on the field, whether the first length is greater than or equal to the second length; and if the first length is greater than or equal to the second length, determining, by the first in-domain device, the first length as the address length; or if the first length is less than the second length, determining, by the first in-domain device, the second length as the address length, and sending the message to a third in-domain device, wherein the third in-domain device and the first in-domain device are connected to each other.

7. The communication method according to claim 1, wherein the plurality of header fields comprise a version field, a traffic class field, a flow label field, a payload length field, a next header field, a hop limit field, a source address field, and a destination address field that are arranged in sequence, and a length of the source address field is the address length, and/or a length of the destination address field is the address length.

8. The communication method according to claim 7, wherein determining, by the first in-domain device, the start location based on the FHE field comprises:

the first in-domain device determines a plurality of fields behind the FHE field based on the FHE field, wherein the plurality of fields belong to the header fields, and the plurality of fields comprise the field of the address; and the first in-domain device sequentially determines a start location of each field based on the FHE field and a length of each of the plurality of fields.

9. The communication method according to claim 1, wherein the forwarding, by the first in-domain device, the data packet based on the address comprises:

searching, by the first in-domain device, a routing table for a next-hop device based on the address, wherein the routing table is constructed based on the address with the address length; and sending, by the first in-domain device, the data packet to the next-hop device.

10. A communication method, wherein the method comprises:

determining, by a gateway device, an address length;

receiving, by the gateway device, a first packet from a first in-domain device;

extracting, by the gateway device, a first address from the first packet based on the address length and a start location of a field of the first address, wherein the start location of the field of the first address is determined based on a flexible header encoding (FHE) field of the first packet, and wherein the FHE field comprises a plurality of bits, each of the plurality of bits corresponding to one of a plurality of header fields of the first packet and indicating whether a corresponding header field is carried in the first packet;

converting, by the gateway device, the first address into a second address, and generating a second packet; and sending, by the gateway device, the second packet to a server corresponding to the second packet.

11. The communication method according to claim 10, wherein the determining, by a gateway device, an address length comprises:

determining, by the gateway device, the address length based on a total quantity of in-domain devices, wherein the total quantity of in-domain devices is less than or equal to $2^{the\ address\ length}-1$.

12. The communication method according to claim 10, wherein the converting, by the gateway device, the first address into a second address comprises:

adding, by the gateway device, a prefix field in front of the first address to obtain the second address, wherein the prefix field indicates a network segment to which the second address belongs, and a length of the prefix field satisfies: a length of the second address minus a quantity of bits with the address length.

13. The communication method according to claim 10, wherein the converting, by the gateway device, the first address into a second address comprises:

determining, by the gateway device from a first correspondence, the second address corresponding to the first address, wherein the first correspondence comprises at least a correspondence between two types of addresses that identify a same device.

14. The communication method according to claim 10, wherein the plurality of header fields comprise a version field, a traffic class field, a flow label field, a payload length field, a next header field, a hop limit field, a source address field, and a destination address field that are arranged in sequence, and the source address field indicates the first address, or the destination address field indicates the first address.

15. The communication method according to claim 14, wherein determining, by the gateway device, the start location based on the FHE field comprises:
  determining, by the gateway device, a plurality of fields behind the FHE field based on the FHE field, wherein the plurality of fields belong to the header fields, and the plurality of fields comprise the field of the first address; and
  sequentially determining, by the gateway device, a start location of each field based on the FHE field and a length of each of the plurality of fields.

16. The communication method according to claim 10, wherein after the receiving, by the gateway device, a first packet from a first in-domain device, the method further comprises:
  extracting, by the gateway device, the first address and a third address from the first packet based on the address length;
  converting, by the gateway device, the first address into the second address, converting the third address into a fourth address, and generating a third packet; and
  sending, by the gateway device, the third packet to a server corresponding to the third packet.

17. The communication method according to claim 10, wherein:
  a length of the first address is greater than 0 and less than or equal to a length of the second address.

18. A first in-domain device comprising:
  at least one transceiver;
  at least one processor; and
  one or more memories coupled to the at least one processor and storing programming instructions for execution by the at least one processor to:
    receive, by the transceiver a data packet;
    determine, an address length;
    extract an address from the data packet based on the address length and a start location of a field of the address, wherein the start location of the field of the address is determined based on a flexible header encoding (FHE) field of the data packet, and wherein the FHE field comprises a plurality of bits, each of the plurality of bits corresponding to one of a plurality of header fields of the data packet and indicating whether a corresponding header field is carried in the data packet; and
    forward, by the transceiver, the data packet based on the address.

19. The first in-domain device according to claim 18 further comprising programming instructions for execution by the at least one processor to:
  receive, by the transceiver, a message, wherein the message comprises a field indicating an address length; and
  determine the address length based on the address length indicated by the field.

20. The first in-domain device according to claim 19, further comprising programming instructions for execution by the at least one processor to:
  determine an address length preset in the first in-domain device as a first length;
  receive, by the transceiver, a message from a second in-domain device, wherein the message comprises a field indicating a second length, the second length is an address length preset in the second in-domain device, and the in-domain device and the second in-domain device are connected to each other;
  to determine, based on the field, whether the first length is greater than or equal to the second length; wherein when the first length is greater than or equal to the second length, determine the first length as the address length; or
  when the first length is less than the second length, determine the second length as the address length; and
  when the first length is less than the second length, send, by the transceiver, the message to a third in-domain device, wherein the third in-domain device and the in-domain device are connected to each other.

21. The first in-domain device according to claim 18, the plurality of header fields comprise a version field, a traffic class field, a flow label field, a payload length field, a next header field, a hop limit field, a source address field, and a destination address field that are arranged in sequence, and a length of the source address field is the address length, and/or a length of the destination address field is the address length.

22. The first in-domain device according to claim 21, further comprising programming instructions for execution by the at least one processor to:
  determine a plurality of fields behind the FHE field based on the FHE field, wherein the plurality of fields belong to the header fields, and the plurality of fields comprise the field of the address; and
  sequentially determine a start location of each field based on the FHE field and a length of each of the plurality of fields.

23. The first in-domain device according to claim 18, further comprising programming instructions for execution by the at least one processor to:
  search a routing table for a next-hop device based on the address, wherein the routing table is constructed based on the address with the address length; and
  send, by the transceiver, the data packet to the next-hop device.

24. A gateway device, comprising:
  one or more processors;
  at least one transceiver; and
  one or more memories coupled to the at least one processor and storing programming instructions for execution by the at least one processor to:
    receive, by the transceiver, a first packet from a first in-domain device, wherein
    extract a first address from the first packet based on the address length and a start location of a field of the first address, wherein the start location of the field of the first address is determined based on a flexible header encoding (FHE) field of the first packet, and wherein the FHE field comprises a plurality of bits, each of the plurality of bits corresponding to one of a plurality of header fields of the first packet and indicating whether a corresponding header field is carried in the first packet;
    convert the first address into a second address, and generate a second packet; and
    send, by the transceiver, the second packet to a server corresponding to the second packet.

25. The gateway device according to claim 24, further comprising programming instructions for execution by the at least one processor to:
  determine the address length based on a total quantity of in-domain devices, wherein the total quantity of in-domain devices is less than or equal to $2^{the\ address\ length}-1$.

26. The gateway device according to claim 24, further comprising programming instructions for execution by the at least one processor to:

add a prefix field in front of the first address to obtain the second address, wherein the prefix field indicates a network segment to which the second address belongs, and a length of the prefix field satisfies: a length of the second address minus a quantity of bits with the address length.

\* \* \* \* \*